(12) United States Patent
Garcie-Luna-Aceves

(10) Patent No.: US 7,162,539 B2
(45) Date of Patent: Jan. 9, 2007

(54) SYSTEM AND METHOD FOR DISCOVERING INFORMATION OBJECTS AND INFORMATION OBJECT REPOSITORIES IN COMPUTER NETWORKS

(75) Inventor: Jose J. Garcie-Luna-Aceves, San Mateo, CA (US)

(73) Assignee: Adara Networks, Inc., Scotts Valley, CA (US)

( * ) Notice: Subject to any disclaimer, the term of this patent is extended or adjusted under 35 U.S.C. 154(b) by 294 days.

(21) Appl. No.: 09/810,148

(22) Filed: Mar. 15, 2001

(65) Prior Publication Data

US 2001/0056416 A1  Dec. 27, 2001

Related U.S. Application Data

(60) Provisional application No. 60/200,401, filed on Apr. 28, 2000, provisional application No. 60/190,331, filed on Mar. 16, 2000.

(51) Int. Cl.
*G06F 15/173* (2006.01)
(52) U.S. Cl. ...................................... 709/242; 709/228
(58) Field of Classification Search ................ 709/238, 709/203, 229, 219; 718/105
See application file for complete search history.

(56) References Cited

U.S. PATENT DOCUMENTS

| | | | |
|---|---|---|---|
| 5,088,032 A | 2/1992 | Bosack | |
| 5,115,495 A | 5/1992 | Kirkman et al. | |
| 5,774,660 A | 6/1998 | Brendel et al. | |
| 5,822,820 A | 10/1998 | Horikawa et al. | |
| 5,859,966 A | 1/1999 | Hayman et al. | |
| 6,003,030 A | 12/1999 | Kenner et al. | |
| 6,012,067 A | 1/2000 | Sarkar | |
| 6,052,718 A | 4/2000 | Gifford | |

(Continued)

FOREIGN PATENT DOCUMENTS

EP 0817444 1/1998

(Continued)

OTHER PUBLICATIONS

Cisco DistributedDirector, Oct. 1998 http://wwwtlc.iet.unipi.it/VoiceIP/cisco/114.pdf.*

(Continued)

*Primary Examiner*—Krisna Lim
*Assistant Examiner*—Aaron Strange
(74) *Attorney, Agent, or Firm*—Blakely, Sokoloff, Taylor & Zafman LLP

(57) ABSTRACT

An address of an information object repository that should service a client request for an information object is returned in response to a request therefor. The address of the information object repository which is returned is selected according to specified performance metrics regardless of whether or not the information object repository maintains a local copy of the information object that is the client request. In some cases, the address of the information object repository is further selected according to an address of a client making the client request. Further, the address of the information object repository is selected from a number of addresses of information object repositories. The specified performance metrics may include one or more of an average delay from the information object repository to the client, average processing delays at the information object repository, reliability of a path from the information object repository to the client, available bandwidth in said path, and loads on the information object repository. In some cases, the information object repository may be instructed to obtain a copy of the information object after the address of the information object repository is returned in response to the request therefore.

3 Claims, 8 Drawing Sheets

Virtual topology of Web routers

U.S. PATENT DOCUMENTS

| | | | |
|---|---|---|---|
| 6,092,178 A * | 7/2000 | Jindal et al. | 709/105 |
| 6,097,718 A | 8/2000 | Bion | |
| 6,108,703 A | 8/2000 | Leighton et al. | |
| 6,138,162 A * | 10/2000 | Pistriotto et al. | 709/229 |
| 6,154,777 A * | 11/2000 | Ebrahim | 709/227 |
| 6,182,224 B1 | 1/2001 | Phillips et al. | |
| 6,185,619 B1 * | 2/2001 | Joffe et al. | 709/229 |
| 6,201,794 B1 | 3/2001 | Stewart et al. | |
| 6,205,477 B1 * | 3/2001 | Johnson et al. | 709/220 |
| 6,236,652 B1 | 5/2001 | Preston et al. | |
| 6,266,706 B1 | 7/2001 | Brodnik et al. | |
| 6,304,913 B1 * | 10/2001 | Rune | 709/241 |
| 6,314,088 B1 | 11/2001 | Yamano | |
| 6,314,465 B1 * | 11/2001 | Paul et al. | 709/226 |
| 6,317,778 B1 * | 11/2001 | Dias et al. | 709/214 |
| 6,397,246 B1 * | 5/2002 | Wolfe | 709/217 |
| 6,405,252 B1 | 6/2002 | Gupta et al. | |
| 6,415,323 B1 | 7/2002 | McCanne et al. | |
| 6,438,652 B1 * | 8/2002 | Jordan et al. | 709/219 |
| 6,449,647 B1 * | 9/2002 | Colby et al. | 709/226 |
| 6,553,376 B1 | 4/2003 | Lewis et al. | |
| 6,574,609 B1 | 6/2003 | Downs et al. | |
| 6,577,609 B1 | 6/2003 | Sharony | |
| 6,578,066 B1 * | 6/2003 | Logan et al. | 709/228 |
| 6,611,872 B1 | 8/2003 | McCanne | |
| 6,687,731 B1 | 2/2004 | Kavak | |
| 6,708,187 B1 | 3/2004 | Shanumgam et al. | |
| 6,721,291 B1 | 4/2004 | Bergenwall et al. | |
| 6,735,633 B1 | 5/2004 | Welch | |
| 6,741,585 B1 | 5/2004 | Munoz et al. | |
| 6,785,704 B1 | 8/2004 | McCanne | |

FOREIGN PATENT DOCUMENTS

| | | |
|---|---|---|
| EP | 817444 A2 * | 1/1998 |
| EP | 0959601 | 11/1999 |
| EP | 959601 A1 * | 11/1999 |
| EP | 0817444 A3 | 12/2000 |
| WO | WO 98/57275 | 12/1998 |
| WO | WO 99/40514 | 8/1999 |
| WO | WO 01/18641 A1 | 3/2001 |

OTHER PUBLICATIONS

A. Chankunthod, P. Danzig, C. Neerdaels, M. Schwartz, and K. Worrell, "A Hierarchical Internet Object Cache," Proc. USENIX Technical Conference 96, San Diego, California, Jan. 1996.

A. Duda and M.A. Sheldon, "Content Routing in Networks of WAIS Servers," Proc. IEEE 14th International Conference on Distributed Computing Systems, Jun. 1994.

A. Duda and M.A. Sheldon, A. Duda, R. Weiss, J.W. O'Toole, Jr., and D.K. Gifford, "A Content Routing System for Distributed Information Servers," Proc. Fourth International Conference on Extending Database Technology, Mar. 1994.

A. Heddaya and S. Mirad, "WebWave: Globally Load Balanced Fully Distributed Caching of Hot Published Documents," Technical Report BU-CS-96-024, Boston University, Computer Science Department, Oct. 1996.

P. Rodriguez, E.W. Biersack, and K.W. Ross, "Improving The Latency in The Web: Caching or Multicast?," Proc. Third WWW caching workshop, Manchester, UK, Jun. 1998.

D. Karger, E. Lehman, T. Leighton, M. Levine, D. Lewin, and R. Panigraphy, "Consistent Hashing and Random Trees: Distributed Caching Protocols for Relieving Hot Spots on the World Wide Web," Proc. 29th ACM Symposium on Theory of Computing (STOC 97), El Paso, Texas, 1997.

D. Karger, Sherman A. Berkheimer, B. Bogstad, R. Dhanidina, K. Iwamoto, B. Kim, L. Matkins, and Y. Yerushalmi, "Web Caching with Consistent Hashing," Proc. 8th International World Wide Web Conference, Toronto, Canada, May 1999.

D. Small and W.W. Chu, "A Distributed Data Base Architecture for Data Processing in a Dynamic Environment," Proc. COMPCON 79 Spring.

D. Wessels and K. Claffy, Internet Cache Protocol (ICP), Version 2, RFC 2186, Sep. 1997.

D. Wessels, "Squid Internet Object Cache," http://www.squid.org, Aug. 1998.

D.G. Thaler and C.V. Ravishankar, "Using Name Based Mappings To Increase Hit," IEEE/ACM Trans. Networking, 1998.

G. Chiu, C.S. Rahgavendra, and S.M. Ng, "Resource Allocation with Load Balancing Consideration in Distributed Computing Systems," Proc. IEEE INFOCOM 89, Ottawa, Ontario, Canada, Apr. 1989, pp. 758-765.

H.L. Morgan and K.D. Levin, "Optimal Program and Data Location in Computer Networks," Communications of the ACM, vol. 20, No. 5, May 1977.

J.D. Guyon and M.F. Schwartz, "Locating Nearby Copies of Replicated Internet Servers," Technical Report CU-CS-762-95, Department of Computer Science, University of Colorado- Boudler, Feb. 1995.

K.W. Ross, "Hash Routing for Collections of Shared Web Caches," IEEE Network, vol. 1, No. 6, Nov. 1997, pp. 37-44.

L. Zhang, S. Michel, S, Floyd, and V. Jacobson, "Adaptive Web Caching: Towards a New Global Caching Architecture," Proc. Third International WWW Caching Workshop, Manchester, England, Jun. 1998.

B.S. Michel, K. Nikoloudakis, P. Reiher, and L. Zhang, "URL Forwarding and Compression in Adaptive Web Caching," Proc. IEEE Infocom 2000, Tel Aviv, Israel, Apr. 2000.

M.A. Sheldon, A. Duda, R. Weiss, J.W. O'Toole, Jr., and D.K. Gifford, "A Content Routing System for Distributed Information Servers," Proc. Fourth International Confernce on Extending Database Technology, Mar. 1994.

P. Rodriguez and E.W. Briesack, "Continuous Multicast Push of Web Documents over The Internet," IEEE Network Magazine, vol. 12, No. 2, pp. 18-31, 1998.

Proc. ACM SIGCOMM 95 Conference, Cambridge, Massachuesetts, Aug. 1995, pp. 288-298.

R. Tewari, M. Dahlin, H.M. Vin and J.S. Kay, "Design Considerations for Distributed Caching on the Internet," Proc. IEEE 19th International Conference on Distributed Computing Systems, May 1999.

S. Mahmoud and J.S. Riordon, "Optimal Allocation of Resources in Distributed Information Networks," ACM Transactions on Data Base Systems, vol. 1, No. 1, Mar. 1976.

T. Berners-Lee, "Information Management: A Proposal," CERN Document, Mar. 1989.

W.W. Chu, "Optimal File Allocation in a Multiple Computer System," IEEE Transactions on Computers, Oct. 1969.

W.W. Chu, "Performance of File Directory Systems for Data Bases in Star and Distributed Networks," Proc. National Computer Conference, 1976, pp. 577-587.

Z. Fei, S. Bhattacharjee, E.W. Zegura, and H.M. Ammar, "A Novel Server Selection Technique for Improving The Response Time of a Replicated Service," Proc. IEEE Infocom 98, Mar. 1998, pp. 783-791.

R. Tewari, "Architectures and Algorithms for Scalable Wide-area Information Systems," Ph.D. Dissertation, Chapter5, Computer Science Department, University of Texas as Austin, Aug. 1998.

http://www.nlar.net/Cache/ICP/draft-vinod-icp-traffic-dist-00.txt, Sep. 10, 2001.

http://wwwcache.ja.net/events/workshop/papers.html, Oct. 3, 2001.

http://www.cs.utexas.edu/users/UTCS/techreports/, Sep. 10, 2001.

Li Fan, Pei Cao, Jussara Almeida, and Andrei Z. Broder, "Summary Cache: A Scalable Wide-Area Web Cache Sharing Protocol," in Proceedings Sigcomm '98. ACM, Oct. 1998.

Tim Berners-Lee, et al., "HTDaemon: TCP/IP based server for Hypertex4t", source code as of Jul. 8, 1994.

Jueneman, Robert R., "Novell Certificate Extension Attributes", *Tutorial and Detailed Design,* (Aug. 7, 1998), Version 0.998.

MacLarty, G. , et al., "Policy-based content delivery: an active network approach", *Computer Communications 24* (2001), University of Technology, Sydney, Faculty of Information Technology, Australia, Elsevier Science B.V 2001,(2001),241-248.

V. Valloppillil and J. Cohen, "Hierarchical HTTP Routing Protocol," Internet Draft (Apr. 21, 1997) http://www.nlanr.net/Cache/ICP/draft-vinod-icp-traffic-dist-00.txt.

S. Gadde, M. Rabinovich, and J. Chase, "Reduce, reuse, recycle: An approach to building large Internet caches," pp. 1-6 (Jan. 16, 1997).

C. Parsa and J.J. Garcia-Luna-Aceves, "Improving TCP Performance over Networks with Heterogeneous Transmission Media," Proc. IEEE ICNP 99 (1999).

Craig Partridge, Trevor Mendez, and Walter Milliken, "Host Anycasting Service," Network Working Group, RFC 1546 (Nov. 1993).

PCT Notification of Transmittal of the International Search Report or the Declaration for PCT Counterpart Application No. PCT/US01/08701, 7 pgs. (Oct. 21, 2003).

C. Hedrick, "Routing Information Protocol," Network Working Group, RFC 1058 (Jun. 1988).

* cited by examiner

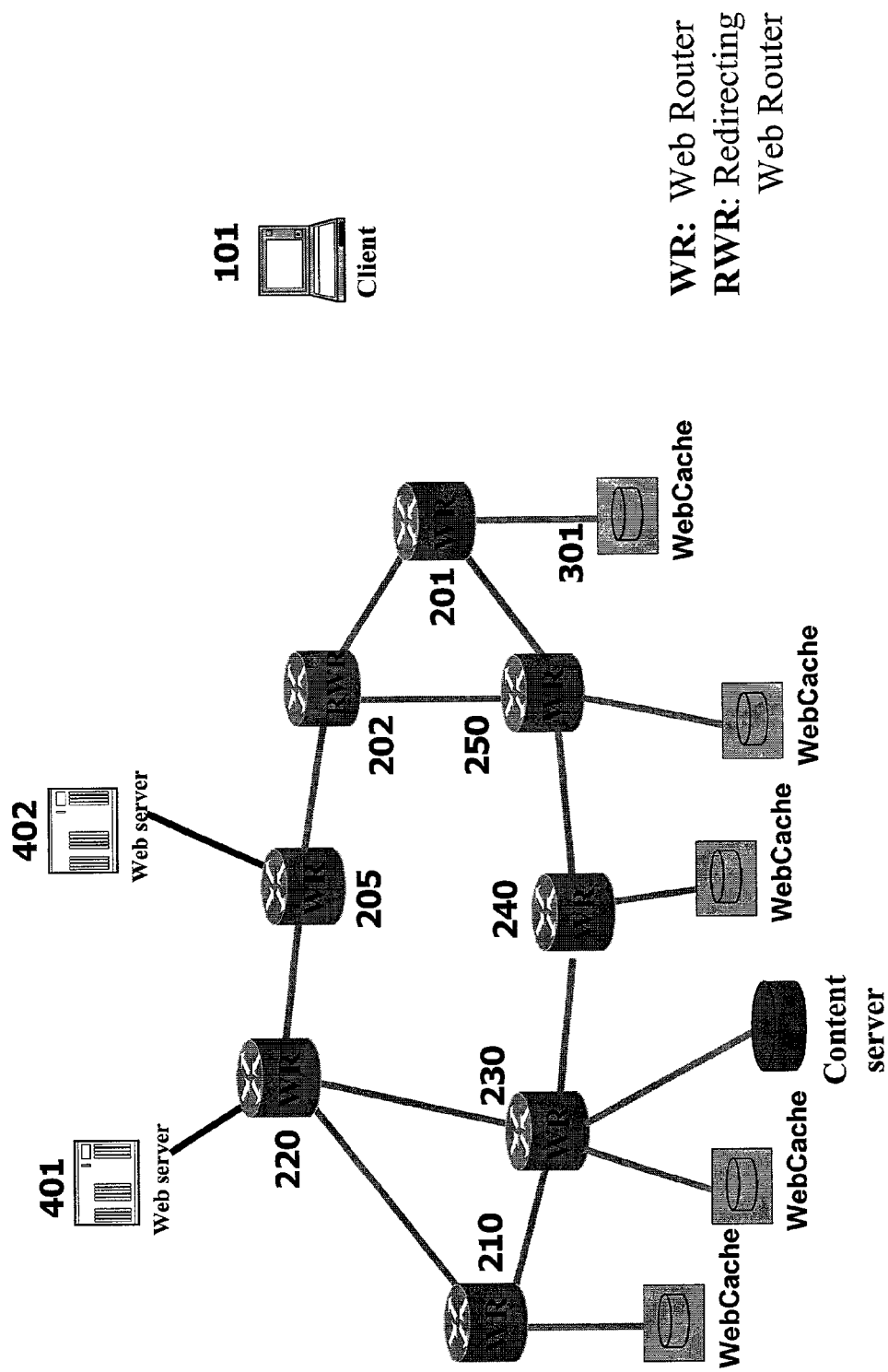
Figure 2: Virtual topology of Web routers

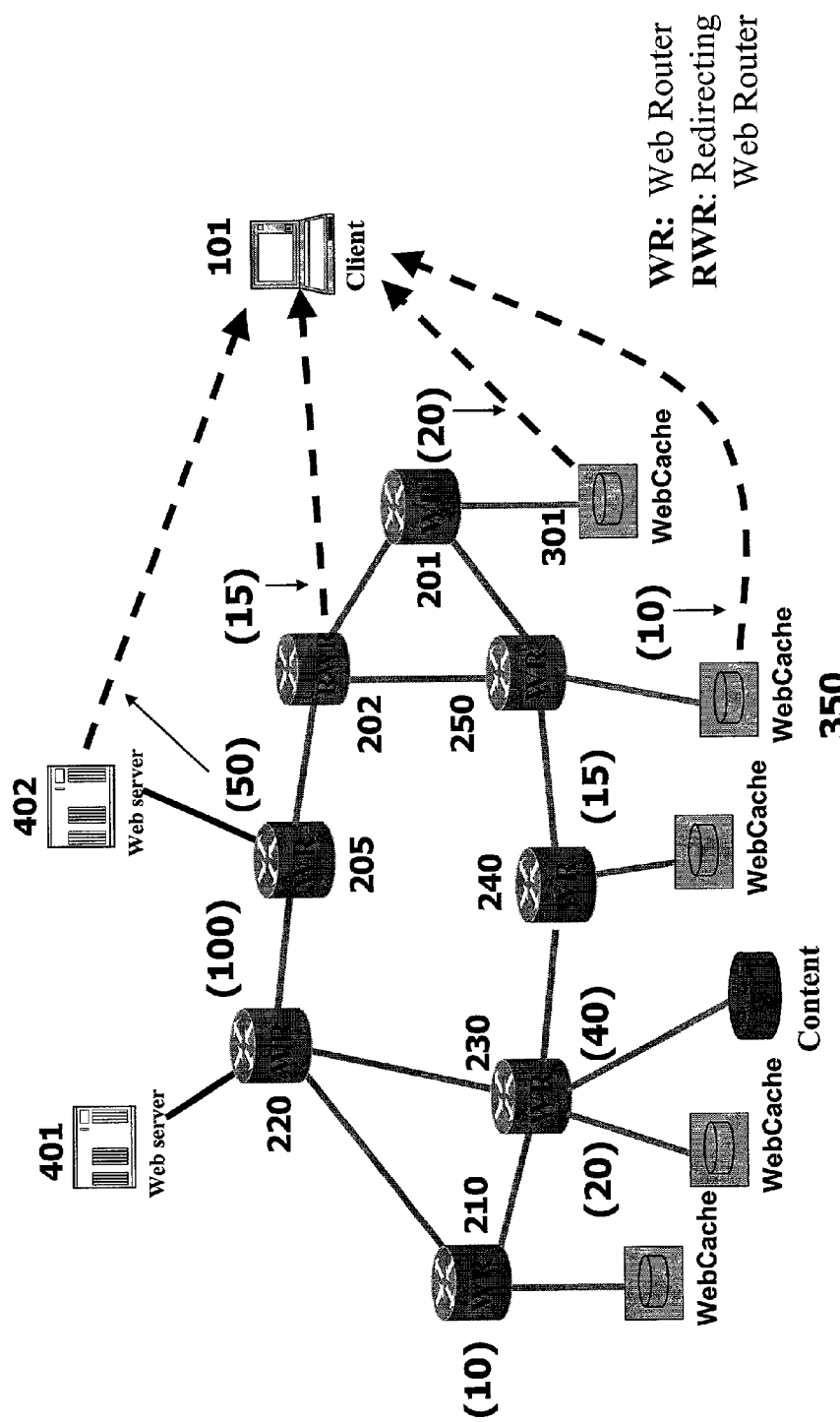
Figure 3: Local TOS distances from Web caches to client addresses stored at Web routers

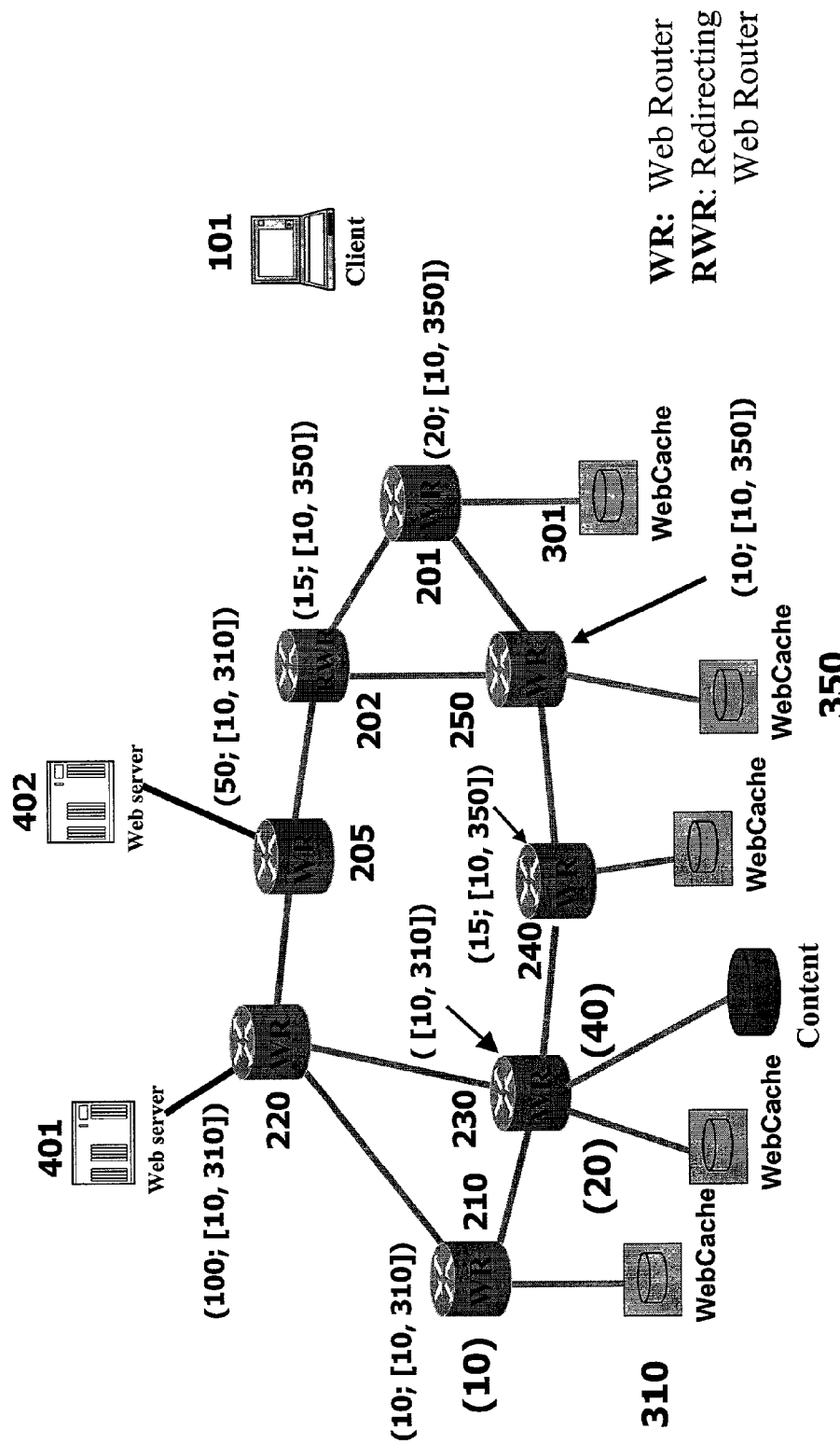
Figure 4: Best TOS distances from Web routers to client addresses

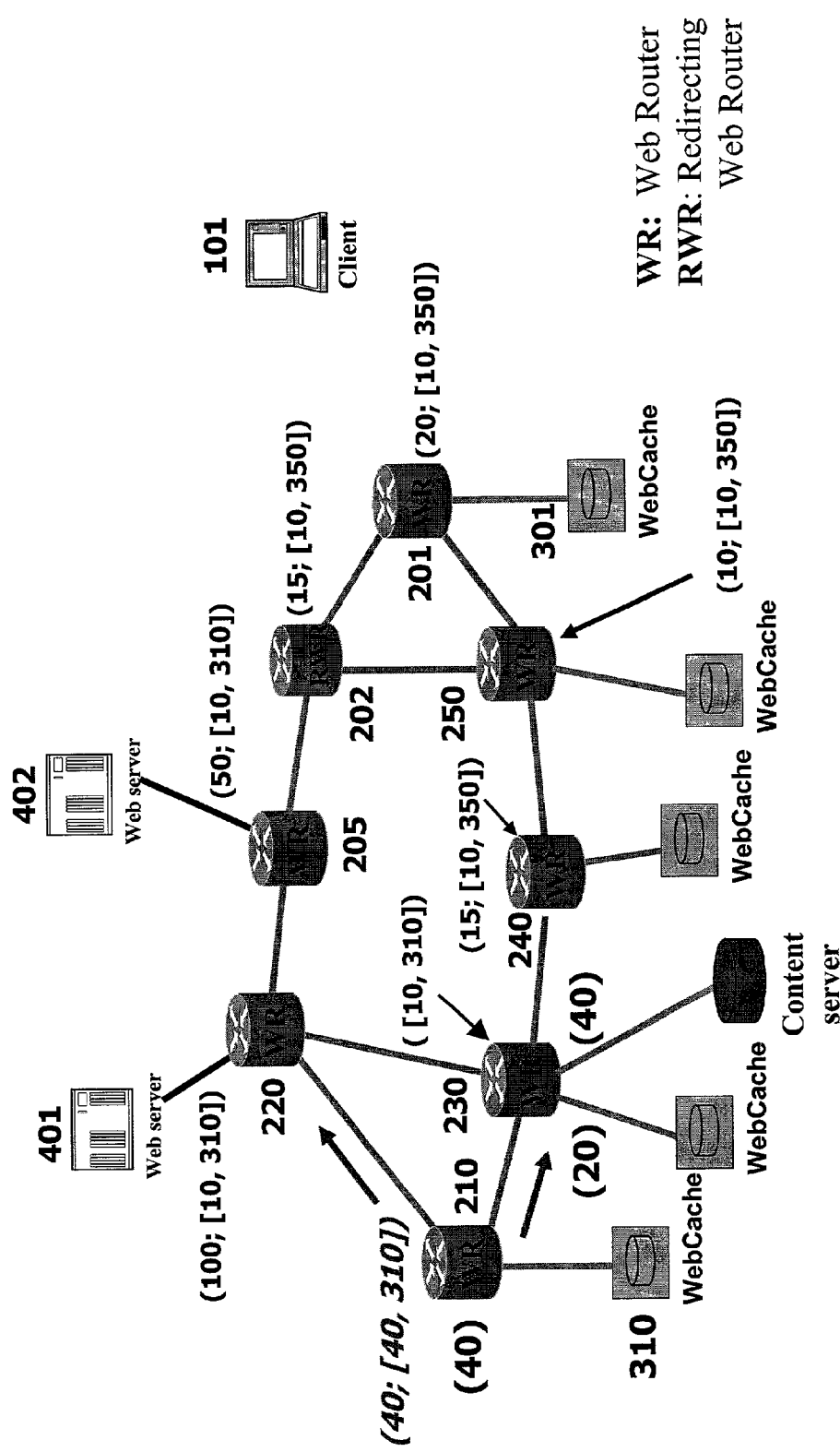
Figure 5(a): Updating the best TOS distances from Web routers to client addresses

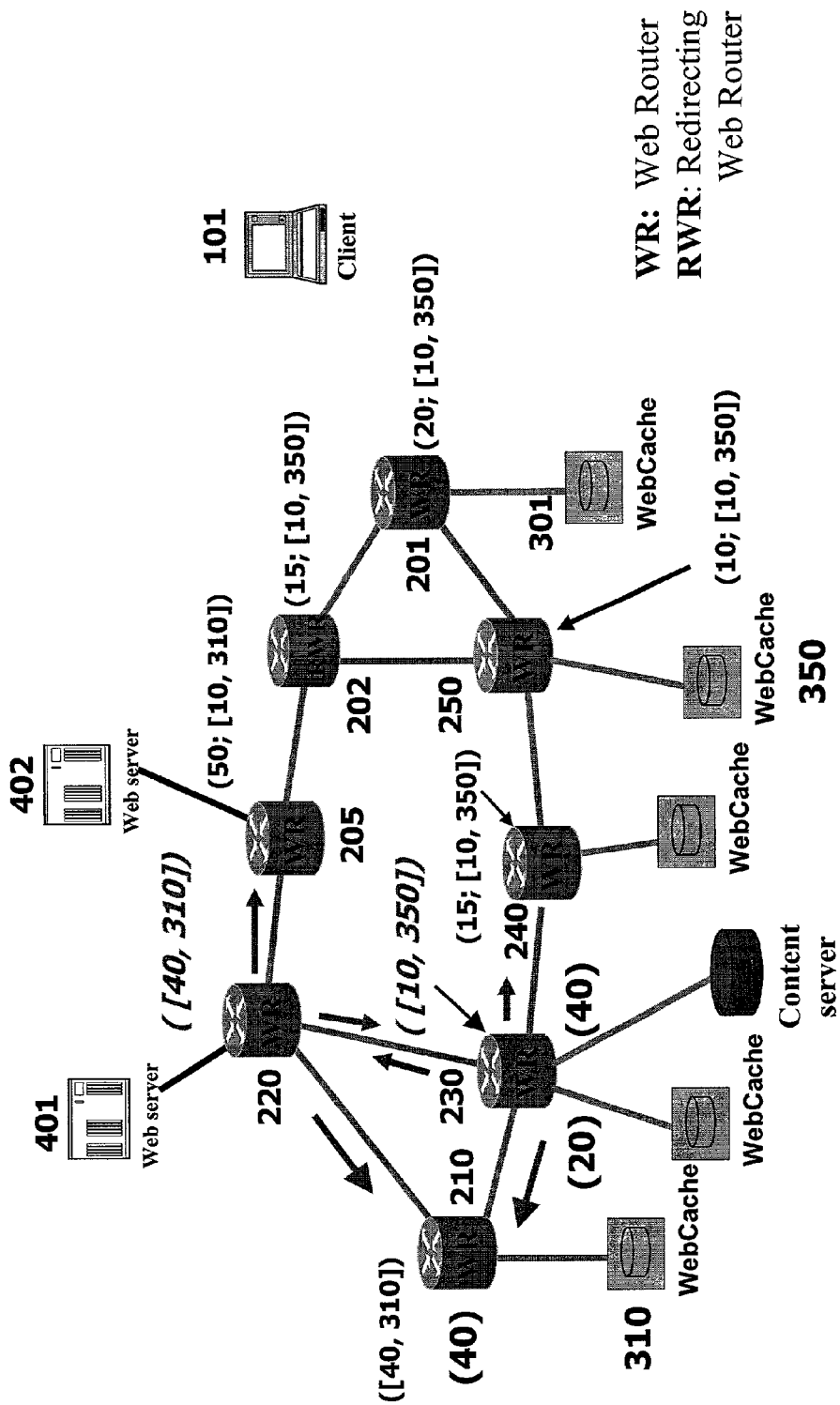
Figure 5(b): Updating the best TOS distances from Web routers to client addresses

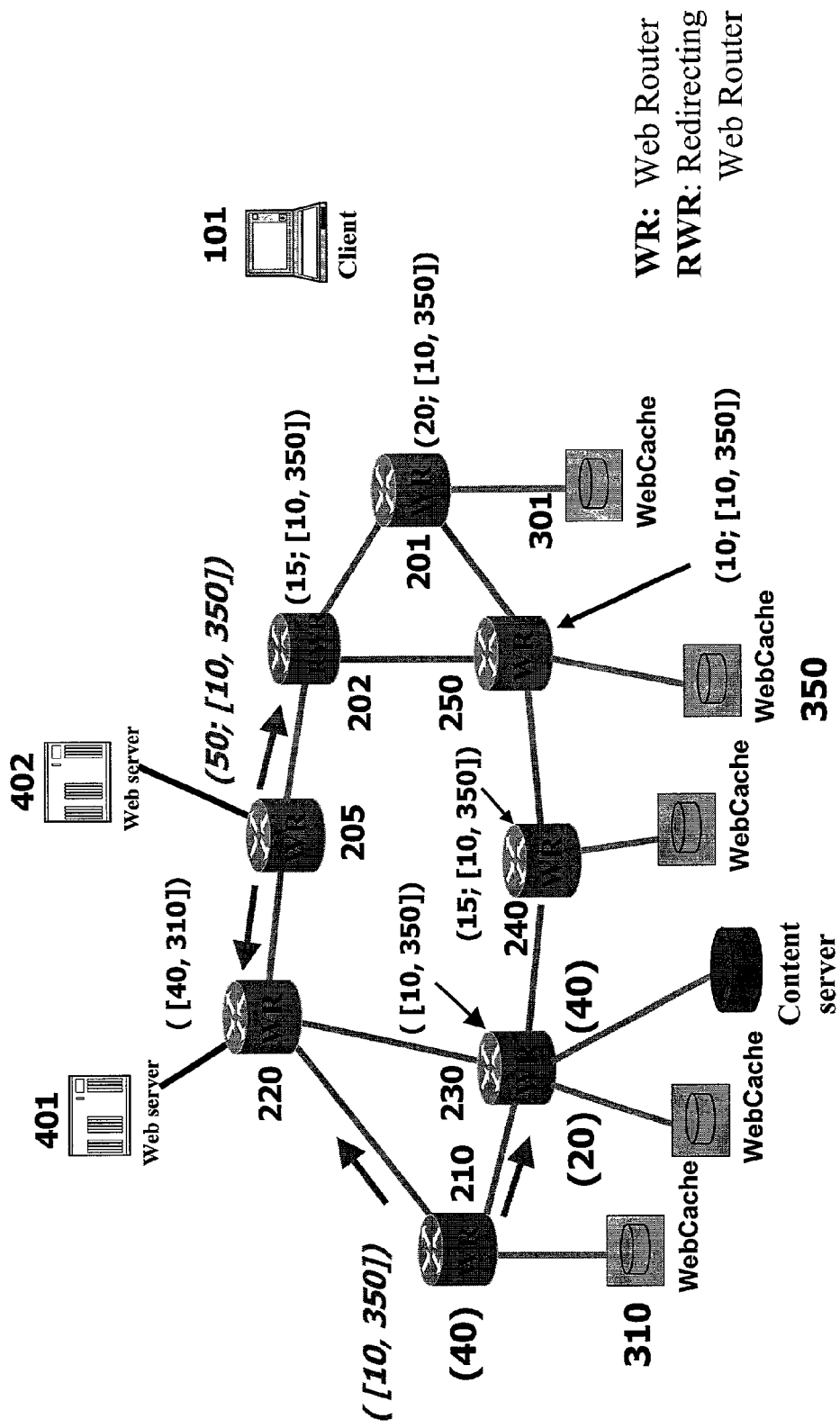
Figure 5(c): Updating the best TOS distances from Web routers to client addresses

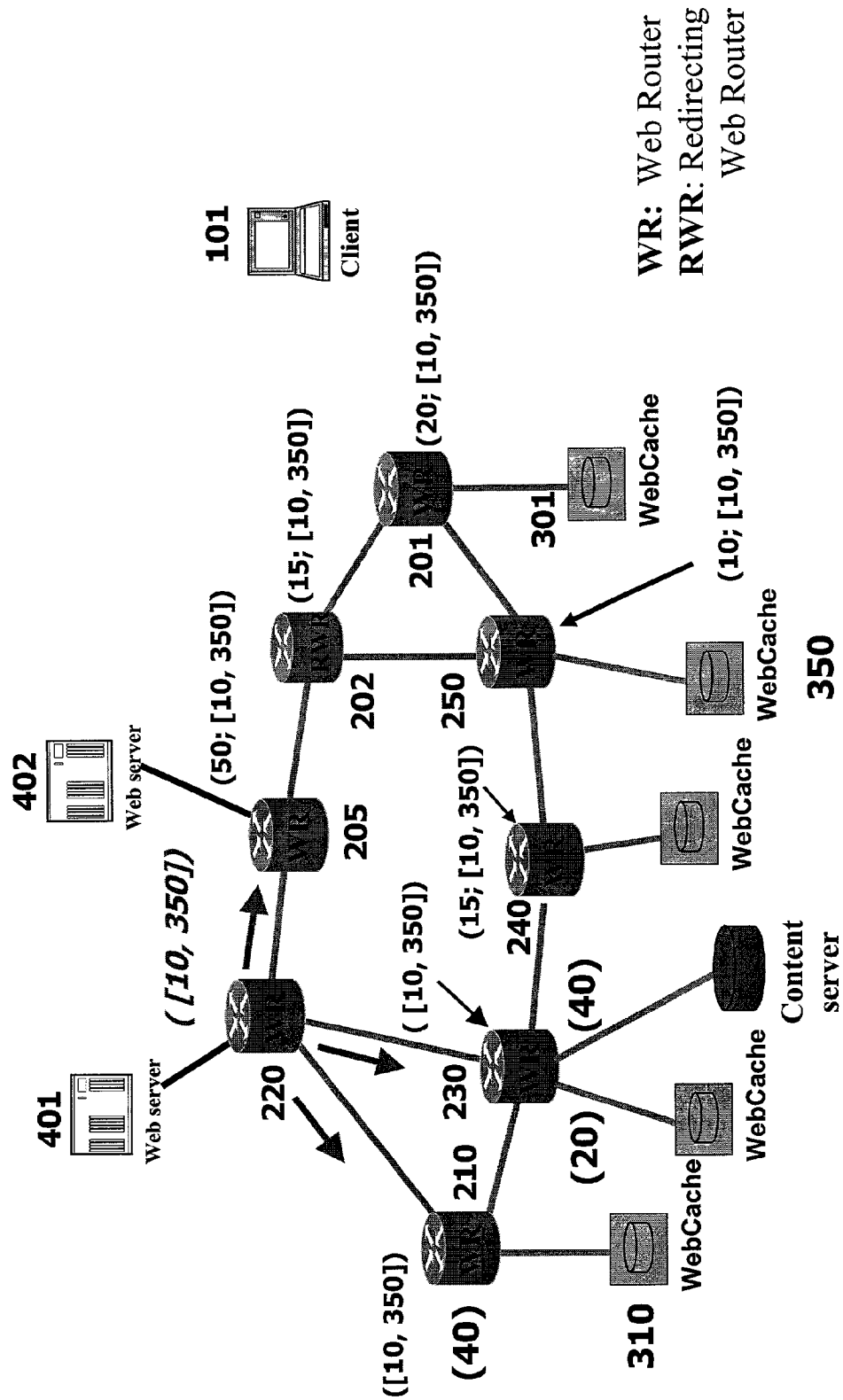
Figure 5(d): Updating the best TOS distances from Web routers to client addresses

SYSTEM AND METHOD FOR DISCOVERING INFORMATION OBJECTS AND INFORMATION OBJECT REPOSITORIES IN COMPUTER NETWORKS

RELATED APPLICATIONS

The present application is related to and hereby claims the priority benefit of the following U.S. Provisional Patent Applications:

Application Ser. No. 60/190,331, entitled "SYSTEM AND METHOD FOR DISCOVERING INFORMATION OBJECTS AND INFORMATION OBJECT REPOSITORIES IN COMPUTER NETWORKS", filed Mar. 16, 2000 by J. J. Garcia-Luna-Aceves; and Application Ser. No. 60/200,401, entitled "SYSTEM AND METHOD FOR DISCOVERING OPTIMUM INFORMATION OBJECT REPOSITORIES IN COMPUTER NETWORKS (WILD PROTOCOL)", filed Apr. 28, 2000 by J. J. Garcia-Luna-Aceves and Bradley R. Smith.

FIELD OF THE INVENTION

The present invention relates to a system and method for the discovery of information objects and servers storing information objects distributed over computer networks, and servers that are most efficient to access according to types of service parameters. More particularly, the present invention relates to discovering the location of caches and hosting sites in the World Wide Web that are most efficient to access from an object requestor standpoint, and bringing requested information objects and services to such caches and hosting sites on demand.

BACKGROUND

An internetwork is a collection of computer networks interconnected by nodes, each such node may be a general-purpose computer or a specialized device, such as a router. As such, an internetwork is often called a network of networks. The purpose of building an internetwork is to provide information services to end nodes, each end node may be a general-purpose computer or a specialized device, such as a camera or a display. The Internet is an internetwork in which information is organized into packets to be distributed on a store-and forward manner from source to destination end nodes, and in which routers and end nodes use the Internet Protocol (IP) to communicate such packets.

The World Wide Web (also known as WWW or Web) has become an essential information service in the Internet. The Web constitutes a system for accessing linked information objects stored in end nodes (host computers) all over the Internet. Berners-Lee wrote the original proposal for a Web of linked information objects (T. Berners-Lee, "Information Management: A Proposal," CERN Document, March 1989). The Web consists of a vast collection of information objects organized as pages, and each page may contain links to other pages or, more generally, information objects with which content is rendered as audio, video, images, text or data. Pages are viewed by an end user with a program called a browser (e.g., Netscape Navigator™). The Web browser runs in an end system at the user premises. The client (Web browser) obtains the required information objects from a server (Web server) using a request-response dialogue as part of the Hypertext Transfer Protocol (HTTP). Information objects are identified by means of names that are unique throughout the Internet; these names are called Uniform Resource Locators or URLs. A URL consists of three components:

(1) the protocol or scheme to be used for accessing the object (e.g., http);
(2) the name (a DNS name) of the host on which the object is located; and
(3) a local identifier that is unique in the specified host.

Like any large-scale system, the Web requires the use of mechanisms for scaling and reliability. More specifically, as the number of information objects that can be obtained through the Web increases, people find it more difficult to locate the specific information objects they need. Furthermore, as the number of Web users and servers increase, the sites or servers that store the requested information objects may be very far from the users requesting the objects, which leads to long latencies in the access and delivery of information, or the servers storing the information objects may be overwhelmed with the number of requests for popular information objects.

To enable the Web to scale to support large and rapidly increasing numbers of users and a vast and growing collection of information objects, the information objects in the Web must be stored distributedly at multiple servers, in a way that users can retrieve the information objects they need quickly and without overwhelming any one of the servers storing the objects. Accordingly, distributing information objects among multiple sites is necessary for the Web to scale and be reliable. The schemes used to accomplish this are called Web caching schemes. In a Web caching scheme, one or multiple Web caches or proxy Web servers are used in computer networks and the Internet to permit multiple host computers (clients) to access a set of information objects from sites other than the sites from which the content (objects) are provided originally. Web caching schemes support discovering the sites where information objects are stored, distributing information objects among the Web caches, and retrieving information objects from a given Web cache. The many proposals and implementations to date differ on the specific mechanisms used to support each of these services.

Many methods exist in the prior art for determining the server, cache, mirror server, or proxy from which information objects should be retrieved. The prior art dates to the development of the ARPANET in the 1970s and the study and implementation of methods to solve the file allocation problem (FAP) for databases distributed over the ARPANET and computer networks in general.

File allocation methods for distributed databases (e.g., W. W. Chu, "Optimal File Allocation in a Multiple Computer System," IEEE Transactions on Computers, October 1969; S. Mahmoud and J. S. Riordon, "Optimal Allocation of Resources in Distributed Information Networks," ACM Transactions on Data Base Systems, Vol. 1, No. 1, March 1976; H. L. Morgan and K. D. Levin, "Optimal Program and Data Locations in Computer Networks," Communications of the ACM, Vol. 20, No. 5, May 1977) and directory systems (e.g., W. W. Chu, "Performance of File Directory Systems for Data Bases in Star and Distributed Networks," Proc. National Computer Conference, 1976, pp. 577–587; D. Small and W. W. Chu, "A Distributed Data Base Architecture for Data Processing in a Dynamic Environment," Proc. COMPCON 79 Spring) constitute some of the earliest embodiments of methods used to select a delivery site for accessing a file or information object that can be replicated at a number of sites.

Another example of this prior art is the method described by Chiu, Raghavendra and Ng (G. Chiu, C. S. Rahgavendra, and S. M. Ng, "Resource Allocation with Load Balancing Consideration in Distributed Computing Systems," Proc. IEEE INFOCOM 89, Ottawa, Ontario, Canada, April 1989, pp. 758–765). According to this method, several identical copies of the same resource (e.g., a file, an information object) are allocated over a number of processing sites (e.g., a mirror server, a cache) of a distributed computing system. The method attempts to minimize the cost incurred in replicating the resource at the processing sites and retrieving the resource by users of the system from the processing sites.

More recent work has addressed the same resource allocation and discovery problems within the context of Internet services. Guyton and Schwartz (J. D. Guyton and M. F. Schwartz, "Locating Nearby Copies of Replicated Internet Servers," Proc. ACM SIGCOMM 95 Conference, Cambridge, Mass., August 1995, pp. 288–298) describe and analyze server location techniques for replicated Internet services, such as Network Time Protocol (NTP) servers and Web caches. Several different approaches exist in the prior art for discovering information objects in Web caching schemes.

One approach to object discovery consists in organizing Web caches hierarchically. In a hierarchical Web cache architecture, a parent-child relationship is established among caches; each cache in the hierarchy is shared by a group of clients or a set of children caches. A request for an information object from a client is processed at a lowest-level cache, which either has a copy of the requested object, or asks each of its siblings in the hierarchy for the object and forwards the request to its parent cache if no sibling has a copy of the object. The process continues up the hierarchy, until a copy of the object is located at a cache or the root of the hierarchy is reached, which consists of the servers with the original copy of the object.

One of the earliest examples of hierarchical Web caching was the Discover system (A. Duda and M. A. Sheldon, "Content Routing in Networks of WAIS Servers," Proc. IEEE 14th International Conference on Distributed Computing Systems, June 1994; M. A. Sheldon, A. Duda, R. Weiss, J. W. O'Toole, Jr., and D. K. Gifford, "A Content Routing System for Distributed Information Servers," Proc. Fourth International Conference on Extending Database Technology, March 1994), which provides associative access to servers; the user guides the refinement of requests.

Harvest (A. Chankhunthod, P. Danzing, C. Neerdaels, M. Schwartz, and K. Worrell, "A Hierarchical Internet Object Cache," Proc. USENIX Technical Conference 96, San Diego, Calif., January 1996) and Squid (D. Wessels, "Squid Internet Object Cache," http:// www.squid.org, August 1998) are two of the best known hierarchical Web cache architectures. Harvest and Squid configure Web caches into a static hierarchical structure in which a Web cache has a static set of siblings and a parent. The Internet Caching Protocol or ICP (D. Wessels and K. Claffy, "Internet Cache Protocol (ICP), Version 2," RFC 2186, September 1997) is used among Web caches to request information objects.

In the Harvest hierarchies, siblings and parents are configured manually in Web caches or proxies; this is very limiting and error prone, because reconfiguration must occur when a cache enters or leaves the system. A more general limitation of hierarchical Web caching based on static hierarchies is that the delays incurred in routing requests for information objects can become excessive in a large-scale system, and the latency of retrieving the information object from the cache with a copy of the object can be long, because there is no correlation between the routing of the request to a given cache in the hierarchy and the network delay from that cache to the requesting client. Furthermore, some Web caches may be overloaded with requests while others may be underutilized, even if they store the same objects.

In the WebWave protocol (A. Heddaya and S. Mirdad, "WebWave: Globally Load Balanced Fully Distributed Caching of Hot Published Documents," Technical Report BU-CS-96-024, Boston University, Computer Science Department, October 1996; A. Heddaya and S. Mirdad, "WebWave: Globally Load Balanced Fully Distributed Caching of Hot Published Documents," Proc. IEEE 17th International Conference on Distributed Computing Systems, Baltimore, Md., May 1997) Web caches are organized as a tree rooted at the server that provides the original copy of one object or a family of information objects; the leaves of the tree are the clients requesting the information objects, and the rest of the nodes in the tree are Web caches. The objective of the protocol is to achieve load balancing among Web caches; each Web cache in such a tree maintains a measurement of the load at its parent and children in the tree, and services or forwards the request to its parent automatically based on the load information. This approach reduces the possibility of overloading Web caches as in the Harvest approach to hierarchical Web caching; however, delays are still incurred in the propagation of requests from heavily loaded Web caches to their ancestors in the Web hierarchy.

Hash routing protocols (K. W. Ross, "Hash Routing for Collections of Shared Web Caches," IEEE Network, Vol. 11, No. 6, November 1997, pp 37–44) constitute another approach to support object discovery in shared caches. Hash routing protocols are based on a deterministic hashing approach for mapping an information object to a unique cache (D. G. Thaler and C. V. Ravishankar, "Using Name-Based Mappings To Increase Hit," IEEE/ACM Trans. Networking, 1998; V. Valloppillil and J. Cohen, "Hierarchical HTTP Routing Protocol," Internet Draft, http://www.nlanr.net/Cache/ICP/draft-vinod-icp-traffic-dist-00.txt) to distribute the information objects (universal resource locator or URL in the case of the Web) among a number of caches; the end result is the creation of a single logical cache distributed over many physical caches. An important characteristics of this scheme is that information objects are not replicated among the cache sites. The hash function can be stored at the clients or the cache sites. The hash space is partitioned among the N cache sites when a client requires access to an information object o, the value of the hash function for o, h(o), is calculated at the client or at a cache site (in the latter case the cache would be configured at the client, for example). The value of h(o) is the address of the cache site to contact in order to access the information object o.

The Cache Resolver is another recent approach to hierarchical Web caching (D. Karger, E. Lehman, T. Leighton, M. Levine, D. Lewin, and R. Panigrahy, "Consistent Hashing and Random Trees: Distributed Caching Protocols for Relieving Hot Spots on the World Wide Web," Proc. 29th ACM Symposium on Theory of Computing (STOC 97), El Paso, Tex., 1997; D. Karger, Sherman, A. Berkheimer, B. Bogstad, R. Dhanidina, K. Iwamoto, B. Kim, L. Matkins, and Y. Yerushalmi, "Web Caching with Consistent Hashing," Proc. 8th International World Wide Web Conference, Toronto, Canada, May 1999). This approach combines hierarchical Web caching with hashing and consists of two main tools, random cache trees and consistent hashing. A tree of Web caches is defined for each information object. When a browser (client) requires an information object, it picks a leaf of the tree and submits a request containing its identifier, the identifier of the object, the sequence of caches through which the request is to be routed if needed. A Web cache receiving a request, it determines if it has a local copy of the page and responds to the request if it does; otherwise, it forwards the request to the next Web cache in the path included in the request.

A Web cache starts maintaining a local copy of an information object when the number of requests it receives for the object reaches a predefined number. A client selects a Web cache by means of consistent hashing, which disseminates requests to leaves of the Web caching hierarchy evenly but, unlike traditional hashing techniques, need not redistribute an updated hash table every time a change occurs in the caching hierarchy (e.g., a new Web cache joins or a Web cache fails). Because caching is difficult to implement or add to existing Web browsers, the Cache Resolver approach implements the hashing in DNS servers modified to fit this purpose.

The remaining limitations with this approach stem from the continuing use of a hierarchy of Web caches and the need to implement a hashing function in either Web clients or DNS servers. Routing a request through multiple Web caches can incur substantial delays for clients to retrieve information objects that are not popular among other clients assigned to the same Web cache by the hashing function. Additional delays, even if small, are incurred at the DNS server that has to provide the address of the Web cache that the client should access. Furthermore, the DNS servers supporting the consistent hashing function must receive information about the loading of all the Web caches in the entire system, or at least a region of the system, in order to make accurate load-balancing decisions.

This DNS-based approach, without the use of hierarchies of Web caches, is advocated in the Akamai CDN solution (F. T. Leighton and D. M. Lewin, "Global Hosting System," U.S. Pat. No. 6,108,703, Aug. 22, 2000). The "global hosting system" advocated by Akamai assumes that a content provider services an HTML document in which special URLs specifying a domain name specific to Akamai. When the client needs to obtain the IP address of the Web cache hosting the content specified in the special URL, the client first contacts its local DNS. The local DNS is pointed to a "top-level" DNS server that points the local DNS to a regional DNS server that appears close to the local DNS. The regional DNS server uses a hashing function to resolve the domain name in the special URL into the address of a Web cache (hosting server) in its region, which is referred to as the target Web cache in the present application, in a way that the load among Web caches in the region is balanced. The local DNS passes the address of that Web cache to the client, which in turn sends its request for the information object to that Web cache. If the object resides in the target Web cache, the cache sends the object to the client; otherwise, the object is retrieved from the original content site.

The global hosting system advocated by Akamai was intended to address problems associated with traditional load-balanced mirroring solutions in which a load balancer or a hierarchy of load balancers redirect requests to one of a few hosting sites to balance the load among such sites. Companies such as Cisco Systems of Santa Clara, Calif., F5 Networks, Inc. of Seattle, Wash., Resonate, Inc. of Sunnyvale, Calif., Nortel Networks of Brampton, Ontario, and Foundry Networks, Inc. of San Jose, Calif. currently provide examples of load-balanced solutions. The limitations of the global hosting system are inherent to the fact that the approach is, in essence, a DNS-based load-balanced mirroring solution. The global hosting system selects a target Web cache based entirely on the region that appears to favor the local DNS, which need not favor the client itself, and balances the load among Web caches without taking into account the latency between the Web caches and the clients. In the case of a cache miss, the information object has to be retrieved from the original content site, which means that latencies in the delivery of content can vary widely, unless the content is mirrored in all the caches of all regions.

Another alternative approach to hierarchical web caching and hash routing protocols consists of forwarding client requests for URLs using routing tables that are very similar to the routing tables used today for the routing of IP packets in the Internet (L. Zhang, S. Michel, S. Floyd, and V. Jacobson, "Adaptive Web Caching: Towards a New Global Caching Architecture," Proc. Third International WWW Caching Workshop, Manchester, England, June 1998, B. S. Michel, K. Nikoloudakis, P. Reiher, and L. Zhang, "URL Forwarding and Compression in Adaptive Web Caching," Proc. IEEE Infocom 2000, Tel Aviv, Israel, April 2000). According to this approach, which is referred to as "URL request forwarding" herein, Web caches maintain a "URL request routing table" and use it to decide how to forward URL requests to another Web caches when requested information objects are not found locally. The keys of the URL request routing tables are URL prefixes, which are associated with one ore more identifiers to the next-hop Web caches or cache groups, and a metric reflecting the average delay to retrieve a request from a matching URL.

In this approach, an entry in the URL request routing table specifies a URL prefix and the next-hop Web cache towards an area or neighborhood of Web caches where the object resides. Ideally, a Web cache needs to know where a copy of a given object resides; however, because of the large number of objects (identified by URLs) that can be requested in a system, the URL request forwarding approach requires Web caches to be organized into areas or neighborhoods. All Web caches within the same area know the objects available in every other Web cache in the same area. In addition, for those objects that are not found in the area of a Web cache, the Web cache also maintains the next-hop Web cache towards the area in which a Web cache with the content resides.

Unfortunately, this approach has several scaling and performance limitations. First, requiring each Web cache to know all the Web caches where each object in the area resides incurs a large overhead, which is akin to the overhead of a traditional topology-broadcast protocol for IP routing, with the added disadvantage that the number of objects that can reside in an area can be much larger than the number of IP address ranges maintained in backbone routers of the Internet. Second, because Web caches only know about the next hop towards a URL that does not reside in a region, a request for an object that lies outside the area of a Web cache may traverse multiple Web-cache hops before reaching a Web cache in the area where an object is stored. This introduces additional latencies akin to those incurred in the caching hierarchies proposed in other schemes discussed above. Third, it is difficult to modify Web caches in practice to implement the mechanisms needed for the forwarding of URL requests.

To reduce the delays incurred in hierarchical Web caches, Tewari, Dahlin, Vin and Kay (R. Tewari, "Architectures and Algorithms for Scalable Wide-area Information Systems," Ph.D. Dissertation, Chapter 5, Computer Science Department, University of Texas at Austin, August 1998; R. Tewari, M. Dahlin, H. M. Vin, and J. S. Kay, "Design Considerations for Distributed Caching on the Internet," Proc. IEEE 19th International Conference on Distributed Computing Systems, May 1999) introduce hint caches within the context of a hierarchical Web caching architecture. According to this scheme, a Web cache maintains or has access to a local hint cache that maintains a mapping of an object to the identifier of another Web cache that has a copy of the object and is closest to the local hint cache. Web caches at the first level of the hierarchy maintain copies of information objects, while Web caches at higher levels only maintain hints to the objects. Hints are propagated along the hierarchy topology from the Web caches lower in the hierarchy to Web caches higher in the hierarchy. Furthermore, a Web cache with a copy of an object does not propagate a hint for the object. The limitation with this approach is that a Web caching hierarchy must still be established, which needs to be done manually in the absence of an automated method to establish the hierarchy, and the Web caching hierarchy must match the locality of reference by clients to reduce control overhead.

A number of proposals exist to expedite the dissemination of information objects using what is called "push distribution" and exemplified by Backweb, marimba and Pointcast ("BackWeb: http://www.backweb.com/'"; "'Marimba: http://www.marimba.com/'"; "Pointcast: http://www.pointcast.com/'"). According to this approach, a Web server pushes the most recent version of a document or information object to a group of subscribers. The popular Internet browsers, Netscape Navigator and Internet Explorer™, use a unicast approach in which the client receives the requested object directly from the originating source or a cache. As the number of subscribers of a document or information object increases, the unicast approach becomes inefficient because of processing overhead at servers and proxies and traffic overhead in the network. The obvious approach to make push distribution scale with the number of subscribers consists of using multicast technology. According to this approach (P. Rodriguez and E. W. Briesack, "Continuous Multicast Push of Web Documents over The Internet," IEEE Network Magazine, Vol. 12, No. 2, pp. 18–31, 1998), a document is multicasted continuously and reliably within a multicast group. A multicast group is defined for a given Web document and subscribers join the multicast group of the Web document they need to start receiving the updates to the document. A multicast group consists of the set of group members that should receive information sent to the group by one or multiple sources of the multicast group. The main shortcoming of this particular approach to push distribution are:

The portion of the Internet where subscribers are located must support multicast routing distribution.

A multicast address and group must be used for each Web document that is to be pushed to subscribers, which becomes difficult to manage as the number of documents to be pushed increases.

Furthermore, Rodriguez, Biersack, and Ross (P. Rodriguez, E. W. Biersack, and K. W. Ross, "Improving The Latency in The Web: Caching or Multicast?," Proc. Third WWW Caching workshop, Manchester, UK, June 1998) have shown that multicasting Web documents is an attractive alternative to hierarchical Web caching only when the documents to be pushed are very popular, caching distribution incurs less latency.

Kenner and Karush (B. Kenner and A. Karush, "System and Method for Optimized Storage and retrieval of Data on a Distributed Computer Network," U.S. Pat. No. 6,003,030, Dec. 14, 1999) propose a method for expediting the delivery of information objects to end users. In this method, the end user site is equipped with special software in addition to the Web browser. This software consists of a configuration utility and a client program. The configuration utility is used to download a delivery site file specifying a list of the delivery sites (Web caches or originating Web servers) from which the information objects can be retrieved and a suite of tests that can be run to determine which delivery site to contact. The limitations with this approach stem from the fact that it is not transparent to end user sites. In particular, the end user site needs to run additional software; performance tests must be conducted from the end-user site to one or more delivery sites to decide which site to use; and when changes occur to the delivery sites, a new version of the delivery site file must be retrieved by the end-user site, or new performance tests must be conducted.

Another approach to helping select servers in a computer network (Z. Fei, S. Bhattachaijee, E. W. Zegura, and M. H. Ammar," A Novel Server Selection Technique for Improving The Response Time of a Replicated Service" Proc. IEEE Infocom 98, Mar. 1998, pp. 783–791) consists of broadcasting server loading information after a certain load threshold or time period is exceeded. The limitation of this approach is that, just as with topology-broadcast protocols used for routing in computer networks, the scheme incurs substantial overhead as the number of servers increases.

Another recent approach to directing clients to hosting sites with requested information objects or services is the replica routing approach proposed by Sightpath, Inc. (D. K. Gifford, "Replica Routing," U.S. Pat. No. 6,052,718, Apr. 18, 2000). According to the Replica Routing approach, an information object or service is replicated in a number of replica servers. The replica routing system redirects a client requesting the information object or service to a "nearby" replica of the object or service. In one approach, all replica routers know the replica advertisements from each of the replica servers in the system, which summarize information about their location and observations about the local internetwork topology and performance. Using this flooding of advertisements, a replica router discerns which replica server appears nearby any one client. However, requiring each replica router to receive the advertisements from every other replica server becomes impractical as the number of replica servers and replica routers increases.

To remedy this problem, replica routers are organized into a hierarchy, and replica advertisements are propagated only part way up such router hierarchy. A client request is routed to the root of the hierarchy and from there is forwarded down the hierarchy, until it reaches a replica router with enough knowledge about the replica's internetwork location to make an informed redirection decision. This approach has similar performance and scaling limitations as the prior approaches summarized above based on hierarchies of Web caches, flooding of information among caches or servers, and forwarding of requests over multiple hops.

SUMMARY OF THE INVENTION

The present invention provides a method and system for determining which of a number of available information object repositories should service a client, the information object repository maintaining the information object or service requested by the client, and bringing the information object or service to the information object repository that should service the client. Bringing the information object or service requested by the client to the information object repository which it has been determined should service the client request involves instructing that information object repository to retrieve the information object or service requested by the client from the information object repository which actually maintains the information object or service. Thereafter, upon receiving an instruction to do so, the information object repository which it has been determined should service the client request contacts the information object repository which actually maintains the information object or service requested by the client directly to request the information object or service.

In one embodiment, an address of an information object repository that should service a client request for an information object is returned in response to a request therefor. The address of the information object repository that is returned is selected according to specified performance metrics, regardless of whether or not the information object repository maintains a local copy of the information object that is the client request. In some cases, the address of the information object repository is further selected according to an address of the client making the client request. Further, the address of the information object repository is selected from a number of addresses of information object repositories.

The specified performance metrics may include one or more of an average delay from the information object repository to the client, average processing delays at the information object repository, reliability of a path from the information object repository to the client, available bandwidth in said path, and loads on the information object repository. In some cases, the information object repository may be instructed to obtain a copy of the information object after the address of the information object repository is returned in response to the request therefore.

In addition, an address of an information object repository that maintains a local copy of the object specified in a client request may be returned to the information object repository selected to service the client request. The selection of the information object repository maintaining a copy of an object may be made according to one or more of the specified performance metrics.

In a further embodiment, a communication protocol includes one or more messages passed between Web routers over a reliable transmission protocol used for inter-Web router communication. These messages include information that allows the Web routers to dynamically update mappings of client addresses or address ranges to information object repository addresses based on specified performance metrics, and may also include mappings of information object identifiers to information object repositories that maintain local copies of the information objects. The mappings may be optimal mappings of the client addresses or address ranges to the information object repository addresses, and/or optimal mappings of information object identifiers to information object repository addresses. The specified performance metrics used may be one or more of an average delay from an information object repository to a selected client address or address range, an average processing delay at an information object repository, reliability of a path from an information object repository to a client, available bandwidth in such a path, and loads on an information object repository. The messages may report updated distances from the information object repository addresses to the client addresses or address ranges, these distances being based on the specified performance metrics; and/or updated distances from the information object repository address to the information object repository hosting an information object or service, these distances being based on the specified performance metrics.

Also, the messages may further report, for each updated distance, an associated client address or address range, and/or an associated anchor address of a Wed router co-located with an information object repository that is the subject of the message.

In yet another embodiment, an address of a client seeking an information object is mapped to one or more addresses of information object repositories that have a first best distance to the client address according to specified performance metrics independently of whether the information object repositories maintain a local copy of the information object sought by the client. This mapping may also include a mapping of the address of the client to one or more addresses of redirecting Web routers that have a second best distance to the client according to some or all of the specified performance metrics.

The specified performance metrics may include one or more of an average delay from the information object repositories to the clients, an average processing delay at the information object repositories, reliability of the paths from the information object repositories to the clients, available bandwidth in such paths, and loads on the information object repositories. The distance information between client addresses and information object repositories may be computed according to a shortest-path first algorithm, for example according to routing information provided by inter-network routers. Such routing information may include inter-domain and intra-domain routing information.

Still another embodiment includes verifying mapping information between client addresses or address ranges and one or more information object repositories, and/or mapping information between information object identifiers and information object repository addresses, according to whether or not a minimum-hop distance or other type of distance between a Web router maintaining the mapping information and a Web router that originated the mapping information is finite.

The mapping information may then be adopted for at least one of the client addresses or address ranges and/or for each known information object identifier. In addition, one of the mappings may be selected from among two or more valid mappings for the at least one of the client addresses or address ranges according to type of service distance associated with the mappings. The type of service distances may be determined according to average processing delays at the information object repositories, average delays from the information object repositories to the client addresses or address ranges, reliability of paths between the information object repositories and the client addresses or address ranges, available bandwidth in said paths, and/or loads at the information object repositories. In the case of two or more equal type of service distances, that mapping information which is originated by a Web router having a smallest minimum-hop distance to the Web router maintaining the mapping information may be adopted.

BRIEF DESCRIPTION OF THE DRAWINGS

The present invention is illustrated by way of example, and not limitation, in the figures of the accompanying drawings in which like reference numerals refer to similar elements and in which:

FIG. 2 illustrates a network having a virtual topology of Web routers configured in accordance with an embodiment of the present invention.

FIG. 3 illustrates an example of a local TOS distance known by Web routers to client address ranges from their local Web caches or content servers in accordance with an embodiment of the present invention.

FIG. 4 illustrates and example of the best TOS distances maintained by Web routers for a particular client.

FIGS. 5a–5d illustrate an example of the present invention when a Web router receives a WILD update from a neighbor Web router.

DETAILED DESCRIPTION

Figure 1:
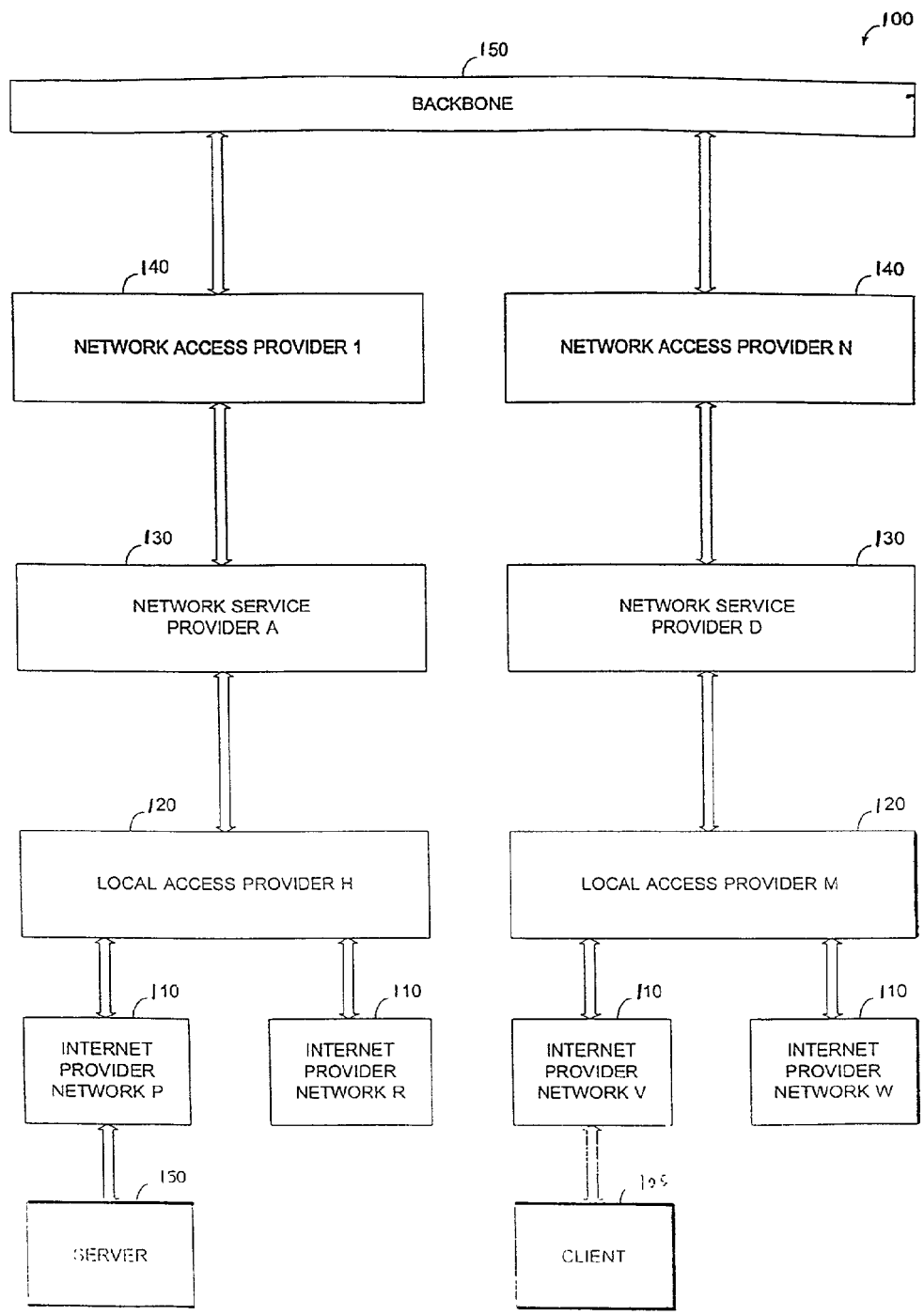
FIG. 1 illustrates a conventional internetwork, such as the Internet.

A scheme for enabling the discovery of the caches and servers storing information objects distributed over computer networks, which can be implemented in hardware and/or software, is disclosed herein. More particularly, a method and system for the discovery of information objects and servers storing information objects distributed over computer networks will now be described. In the following description, numerous specific details are set forth in order to provide a thorough understanding of the present invention. However, it will be evident to those of ordinary skill in the art that some of these specific details need not be used to practice the present invention and/or that equivalents thereof may be used. In other cases, well-known structures and components have not been shown in detail to avoid unnecessarily obscuring the present invention. Thus, although discussed with reference to certain illustrated embodiments, upon review of this specification, those of ordinary skill in the art will recognize that the present system and methods may find application in a variety of systems and the illustrated embodiments should be regarded as exemplary only and should not be deemed to be limiting in scope.

Some portions of the description that follow are presented in terms of algorithms and symbolic representations of operations on data within a computer memory (e.g., in pseudocode). These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

From the above description of the prior art, it should be apparent that none of the prior schemes provide, in a completely scalable manner and in a way that is completely transparent to the clients, (a) the best match between the address of a client and the set of Web caches, hosting servers or content server that can provide the client with objects requested by the client; and (b) the best match between a Web cache or hosting server that should service a client and the Web cache, hosting server or content server that currently holds the information object or service requested by the client. The present invention seeks to address these deficiencies of the prior art.

In accordance with one embodiment of the present invention, a collection of one or multiple "Web routers" is used to refer a request for an object to a Web cache or content server that is able to transfer the requested object to the target client while satisfying a given set of performance metrics. As used herein, the term Web router is used to refer to an embodiment (which may be implemented in hardware and/or software to be executed by a computer system) of a computer system configured in accordance with the methods (described below) needed to map the address of a client with the address of a Web cache that can deliver requested information objects optimally to the client. The performance metrics used by Web routers to choose the sites (Web cache or content server) that should provide the requested objects to the clients can include network delays, available bandwidth, reliability of paths from the chosen sites to the target clients, and loads on the Web caches and content servers. The method used to select the best site from which information objects should be retrieved is transparent to the clients, and the computer network or internetwork over which the system operates need not support multicast delivery to end-user sites.

A system according to one embodiment of the present invention includes one or multiple client nodes, a set of one or more Web servers, one or multiple original content servers, a set of one or multiple Web caches, hosting servers, or proxy servers storing replicas of information objects, and a set of one or multiple Web routers. A Web router may be co-located with a Web server, a Web cache, a hosting server or an original content server. A topology of Web routers is defined such that a given Web router has as its neighbor Web routers a subset of all the Web routers in the system. A Web router communicates directly with its neighbor Web routers, and, preferably, not with other Web routers.

In one embodiment of the present invention, a Web router is contacted according to a scheme for enabling the discovery of the caches and servers storing information objects distributed over computer networks, which can be implemented in hardware and/or software, by a client, a Web server, a Web cache, or another type of server with a request for the address of one or more Web caches that a client should contact to obtain an information object.

In a further embodiment of the present invention, Web routers implement a distributed algorithm and execute a communication protocol with which each Web router determines (a) the address of one or more Web caches from which information objects can be retrieved by a client while satisfying a set of type-of-service (TOS) performance parameters, and (b) the address of one or more Web caches storing information objects from which such objects can be retrieved by other Web caches to service client requests for such information objects. The TOS parameters used include, but are not limited to, the average delay from a cache or content server to the client, the average processing delays at the site from which the object would be retrieved, the reliability of the path from that site to the client, and the available bandwidth in such a path. The value of the TOS parameters of the path from a server or Web cache to a client is called the TOS distance of such a server or Web cache to the client. Accordingly, a given Web router maintains, for each address range corresponding to a set of potential clients, the address of one or more Web caches, proxies, or content server, which have the best TOS distance to the client address and the value of such a TOS distance.

FIG. 1 illustrates an internetwork 100. The methods and systems described herein, which can be implemented in software and/or hardware, enable the discovery of either information objects or the caches and servers storing information objects distributed over computer networks such as the internetwork 100 shown in this illustration. One example of an internetwork 100 is the Internet. Other examples include enterprise networks, local area networks, wide area networks, metropolitan area networks and networks of such networks. In the case where internetwork 100 is the Internet, clients 105 will generally access content located at remote servers 150 through a series of networks operated by different providers. For example, clients 105 may have accounts with local Internet service providers (ISPs) 110 that enable the clients to connect to the Internet using conventional dial-up or one of a variety of high-speed connections (e.g., DSL connections, cable connections, hybrids involving satellite and dial-up connections, etc.). ISPs 110, in turn, may provide direct connections to the Internet or, as shown, may rely on other service providers 120, 130, 140, to provide connections through to a set of high-speed connections between computer resources known as a backbone 150. Connecting to a host (e.g., server 150) may thus involve connecting through networks operated by a variety of service providers.

FIG. 2 illustrates a virtual network of Web routers 201, 202, 205, 210, 220, 230, 240 and 250 defined on top of the physical topology of an internetwork, such as the Internet, consisting of routers interconnected via point-to-point links or networks. The virtual network of Web routers includes point-to-point links configured between the Web routers, and the links configured between a Web router and one or more Web caches (e.g., web cache 301) and content servers. Such links can be implemented using tunnels between Web routers and between Web routers and Web caches. As used herein, the term content server is meant to indicate a server that serves as the origination point for a piece of content (e.g., text, video, audio, etc.). Such content may subsequently be replicated at one or more Web caches. As shown in the figure, a client 101 is not necessarily part of the virtual network of Web routers.

As indicated above, a Web router is one embodiment of the methods described herein for discovering information objects and object repositories in computer networks. The functionality of a Web router can be implemented as part of a Web cache, as part of a router, or as a separate entity. To simplify its description, the Web router is described and treated herein as a separate entity from a Web cache or a router.

A Web router may be co-located with a Web server, a Web cache, or an original content server. In one embodiment of the present invention, a Web router may be implemented in software to be executed by a general purpose (or special purpose) computer processor, or it may be implemented as part of the software of a router or Web cache. In another embodiment of the present invention, some or all of the Web router functionality may be implemented in hardware.

In one embodiment of the present invention, a collection of one or multiple Web routers is used to refer the request for an object to a Web cache or content server that is able to transfer the requested object to the target client while satisfying a given set of TOS parameters, such as network delays, bandwidth available, reliability of paths from the chosen sites to the target clients, and loads on the Web caches and content servers. The method used to select the best site from which information objects should be retrieved by user sites (clients) is transparent to the user sites, and the computer network or internetwork over which the system operates need not support multicast delivery to end-user sites.

To reduce communication and processing overhead in Web routers, a topology of Web routers is defined, such that a given Web router has as its neighbor Web routers a subset of all the Web routers in the system (where the term system refers to all or a portion of the virtual network for Web routers discussed above). A Web router may thus be configured with its set of neighbor Web routers. Such a configuration may be a table of neighbor Web routers which is defined by a network service provider and/or is dynamically updated. In another embodiment of the present invention, a Web router dynamically selects the set of neighbor Web routers with which it should communicate out of all of the Web routers in the system. A Web router preferably communicates with its neighbor Web routers only and uses the Web Information Locator by Distance (WILD) protocol for this purpose. The WILD protocol is disclosed in co-pending and commonly-owned U.S. Provisional Application No. 60/200401, entitled "System and Method for Discovering Optimum Information Object Repositories in Computer Networks (WILD Protocol), filed Apr. 28, 2000 by J. J. Garcia-Luna-Aceves and Bradley R. Smith, the complete disclosure of which is hereby incorporated by reference.

In one embodiment of the present invention, WILD runs on top of the Transmission Control Protocol (TCP) in much the same way as the Border Gateway Protocol (BGP) does; in this case, a TCP connection exists between a Web router and each of its neighbor Web routers. In another embodiment of the present invention, WILD can run on top of the TCP Santa Cruz protocol (C. Parsa and J. J. Garcia-Luna-Aceves, "Improving TCP Congestion Control Over Internets with Heterogeneous Transmission Media," Proc. IEEE ICNP 99), which consists of a TCP option that makes more efficient use of the available bandwidth between Web routers. In yet another embodiment of the present invention, WILD runs on top of a reliable transmission protocol that, in turn, runs on top of the User Datagram Protocol (UDP). Other embodiments of the present invention may be based on alternative protocols for the provision of reliable transmissions between Web routers.

In one example of the operation of a system which employs an embodiment of the present invention, a client first contacts a Web server requesting a Web page in which a set of information objects are referenced by their URLs. In turn, the Web server may contact a Web router to determine the sites (e.g., one or more Web cache(s) or an original content server, any of which may be referred to generically as an information object repository) from which each of such information objects should be retrieved. Depending on the implementation, a Web router can be contacted by a client, a Web cache, a content server, or another type of server (e.g., Web server 401 or 402), asking for the address of a Web cache, set of Web caches, or content server that a client should contact for the purposes of retrieving information objects. In the present example, the Web server provides the Web router with the address of the client requesting the set of object, a URL for each information object requested by the client, and a set of TOS parameter values with which the request should be serviced to the client. The absence of TOS parameters can be assumed to imply a minimum-delay service request.

The Web router maps each URL provided by the Web server to the address of a Web cache or the content server that can provide the associated information object to the client optimally according to the specified TOS parameters. This mapping of URLs to addresses of Web caches or content servers is accomplished by the collaboration among Web routers through WILD. Accordingly, the Web router contacted by the Web server can return the required addresses immediately after processing the request. In turn, the Web server returns a Web page to the requesting client that contains a URL for each information object that points to the Web cache or content server that can provide the information object to the client while meeting the TOS parameters specified in the client's request explicitly or implicitly. The client is then able to retrieve the information objects referenced in the Web page directly from a Web cache, proxy, or content server that has the best TOS path to the client. In other embodiments, the Web router may receive a request from a client, a cache, a Web server, another Web router, a name server, or another type of server, and use the address of the client and the TOS performance parameters specified in the request to obtain the address of a Web cache, set of Web caches, content server, or Web router (i.e., information object repository) that should service the client optimally according to the specified TOS performance parameters.

In one embodiment, if the Web router maps the address of the client requiring the location of information objects to addresses of Web caches that do not currently store such objects, the Web router can request the corresponding Web caches to obtain a copy of the required objects immediately after it provides the requesting Web server the address of such a Web cache or proxy. In another embodiment, a Web cache or proxy attempts to retrieve a requested object from another Web cache or a content server only after it is contacted by a client and determines that a copy of the requested information object is not available locally. In both instances, the Web router provides the Web cache servicing a client request with the address of the "nearest" Web cache that stores the information object requested by the client; therefore, the Web cache needing the information object communicates directly with the Web cache storing the requested information object, without having to go through any intermediate Web caches and without having to know the content stored in all other Web caches as is customary in the prior art.

Building on the above then, the Web router is responsible for determining which of a number of available information object repositories should service a client (i.e., a client or a Web server request for an information object or service). The Web router also determines the information object repository which actually maintains the information object or service so requested, and initiates the process of bringing the information object or service to the information object repository that should service the client. Bringing the information object or service requested by the client to the information object repository which it has been determined should service the client request is accomplished, in one embodiment, by instructing that information object repository which will service the request to retrieve the information object or service requested by the client from the information object repository which actually maintains the information object or service. Thereafter, upon receiving an instruction to do so, the information object repository which it has been determined should service the client request contacts the information object repository that actually maintains the information object or service requested by the client directly to request the information object or service.

In a further embodiment, one of the following four mechanisms, or, a combination of some of the following four mechanisms, is or may be used to communicate the best Web cache or content server, or the set of Web caches, which should serve a client's request:

(1) direct cache selection;
(2) redirect cache selection;
(3) remote DNS cache selection; and
(4) client DNS cache selection.

These approaches are disclosed in co-pending and commonly-owned U.S. Provisional Application No. 60/200,404, entitled "System and Method for Using a Mapping Between Client Addresses and Addresses of Caches to Support Content Delivery", filed Apr. 28, 2000 by J. J. Garcia-Luna-Aceves and Bradley R. Smith, the complete disclosure of which is hereby incorporated by reference.

Those Web routers that are used to redirect clients to appropriate Web caches or content servers must be implemented in a very fault-tolerant manner and must be well known throughout the system. Accordingly, in one embodiment of the present invention not all Web routers in a system are used for client redirection in order to reduce the cost of Web routers and the communication overhead associated with knowing about the existence of Web routers that are capable of redirecting clients to Web caches and content servers. In such a system, a set of redirecting Web routers is defined; the set of redirecting Web routers is known by all the Web routers of the system, while a Web router that does not serve as a redirecting Web router need not be known by all other Web routers of the system.

In general, Web routers execute WILD to map the address of a client into: (a) one or more addresses of Web caches or the content server that has the best TOS distance to the client address, and (b) one or more addresses of redirecting Web routers that have the best TOS distance to the client address. This mapping is done independently of whether the Web caches or content server maintains a local copy of any of the information objects required by the client. Web routers execute WILD to also map the identifier of an information object into: (a) one or more addresses of Web caches or the content server that stores the information object and is nearest to the Web routers according to TOS parameters. A given Web router thus maintains:

For each address and/or address range corresponding to a set of potential clients, the address of a Web cache, proxy, content server, and/or redirecting Web router that has the best TOS distance to the client address and the value of such TOS distance.

For each information object, the address of a Web cache, proxy, or content server that has the best TOS distance to the Web router.

In one embodiment of the present invention, the Internet routers of the system provide Web routers with distances to known destination addresses measured according to a number of network performance parameters. A Web router co-located with a Web cache or content server uses the information obtained from adjacent routers and the performance measurements of the Web cache or content server to derive the TOS distance from the co-located Web cache or content server to each known destination, which corresponds to potential client addresses. In an embodiment of the present invention, Web routers use routing information provided by the Border Gateway Protocol (BGP) and any of the intra-domain routing protocols (e.g., OSPF, EIGRP) running in the routers attached to the same local area networks where the Web routers reside to derive distances to client address ranges.

The specific algorithm that a Web router executes to compute the TOS distance from each local Web cache to a client address range depends on the routing information that the attached routers make available to the Web router. Each Web router may be provided with inter-domain and intra-domain routing information pertaining to all known client address ranges; alternatively, only a subset of Web routers may receive inter-domain routing information directly from one or more routers present in the same network as the Web router. In either case, a Web router executes locally a path-selection algorithm, such as Dijkstra's shortest-path first algorithm, to compute the local TOS distance from attached Web caches to each client address range if the Web router has complete intra-domain and inter-domain routing data, or to the each client address range in the local autonomous system if the Web router only has intra-domain routing data. A Web router can execute a different path-selection algorithm to compute local TOS distances to address ranges for each TOS defined in the system.

Using the same virtual topology of Web routers introduced in FIG. 2, FIG. 3 illustrates an example of the local TOS distances known by Web routers to client address ranges from their local Web caches or content servers. In the figure, a single TOS distance is indicated. The numbers in parenthesis indicate the TOS distance from a Web cache or content server to client 101. The dashed lines indicate that the local TOS distance to client 101 stored at a Web router corresponds to the load of a local Web cache or content server and the congestion in the path from the Web cache or content server to client 101. For instance, the local TOS distance to client 101 stored at Web router 201 is 20 and corresponds to the TOS distance from Web cache 301 to client 101.

Having computed local TOS distances from attached Web caches to all or a subset of client address ranges, a Web router uses this information to compute the best match between a client address range and the set of Web caches that should serve the client address range because they have the best TOS distance to the client. To accomplish this process, for each known destination address and for each TOS defined in the system, a Web router maintains a set of one or more addresses of the Web caches or content servers that have the best TOS distances to the destination address and the value of such distances, as well as the address of one or more Web routers that can be used to redirect requests from clients in the address range and the value of the distances from the redirecting Web routers to the client address range.

The specific algorithm that a Web router executes to compute the distance to the nearest Web cache storing a copy of an information object depends on the routing information that the Web routers use to compute distances to other Web routers, which are collocated with the Web caches storing information objects. A Web router is informed by its local Web caches of the load in the Web caches and the information objects stored in the Web caches. Hence, a Web router knows that its distance to information objects stored in local Web caches is the latency incurred in obtaining those objects from the local Web caches, which is a direct function of the load in those Web caches. Given that a Web router executes a routing algorithm enabling the Web router to know its distance to other Web routers, a Web router selects the nearest Web cache storing a copy of an information object by comparing the local distance to the information object (which is the latency incurred by a local Web cache if the object is stored locally or infinity if the object is not stored locally) with the reported matches of object identifiers to Web caches reported by its neighbor Web routers. The object-cache match report for a given information object specifies the information object identifier, the Web cache where the information object is stored, the Web router that is local to that Web cache, and the distance to the Web cache. The distance specified in the object-cache match report includes explicitly or implicitly the distance from the neighbor Web router to the Web cache specified in the report, plus the load of the Web cache specified in the report. The Web router then chooses the match of information object to Web cache that produces the minimum distance to the Web cache storing the object.

The validity of the information communicated for matches between clients and Web caches and information objects and Web caches can be ascertained in various ways. In a preferred embodiment of the present invention, the validity of the mapping between a client address range and the addresses of Web caches and redirecting Web routers, or the mapping between an information object identifier and a Web cache storing the object, is established using the addresses of and minimum-hop distances to the Web routers that originate the information. A Web router receiving a mapping between a client address range and the addresses of one or more Web caches and redirecting Web routers accepts the mapping information as valid if the minimum-hop distance to the Web router that originated the mapping information is finite. A Web router receiving two valid mappings for the same client address range adopts the mapping that reports the best TOS distances, and in case of ties in TOS distances, the Web router adopts the mapping originated by the Web router to which it has the smallest minimum hop distance. The Web router that originates the mapping information for a given client address range or an information object is called the anchor of the mapping, and is said to be anchoring the mapping for the Web router maintaining the information.

The Web router notifies its neighbor Web routers of updates made to either the address of the Web cache(s), redirecting Web router(s), or the associated best TOS distance for destination address ranges of clients. The Web router also notifies its neighbor Web routers of updates made to either the address of the Web cache(s) or the associated best TOS distance for information object identifiers.

For each known destination address and for each TOS defined in the system, the Web router also maintains the following information reported by each neighbor Web router: (a) the address of the Web cache, content server, or set of Web caches and the best TOS distance from each such Web cache or server to the client address range, and (b) the address of the redirecting Web router or set of Web routers and the best TOS distance from such Web router(s) to the client address range.

For each known information object identifier, the Web router maintains the following information reported by each neighbor Web router: (a) the address of the Web cache storing the object, (b) the address of the Web router that originated the match, (c) the TOS distance to the Web cache storing the information object.

A Web router selects the set of Web caches and content servers, and the set of redirecting Web routers that have the best TOS distances to each known client address range in such a way that out-of-date or erroneous information about TOS distances from Web caches or Web routers to destinations is erased quickly to avoid erroneous referrals or poor load balancing and response times.

In one embodiment of the present invention, Web routers send to one another the TOS distance information from their adjacent Web caches and content servers to all client address ranges. This approach permits Web routers to compute the best match (i.e., Web cache and redirecting Web router) for each address range but can incur substantial overhead, because it forces Web routers to know about the existence of all Web caches and Web routers in the system. To reduce the communication and storage overhead incurred in replicating such information at each Web router, in a preferred embodiment of the present invention, Web routers maintain the minimum-hop distance to each Web router that can be contacted to redirect clients and to each Web router that is co-located with a Web cache that has the best TOS distance to a set of client destinations. The minimum-hop distances to Web routers are maintained by means of a routing algorithm as part of WILD. The routing algorithm used for this purpose can be any of the routing algorithms that have been reported in the prior art for traditional Internet and network-level routing; the only requirement for the routing algorithm used in WILD is for the algorithm to avoid permanent or long-lasting routing-table loops. For instance, a preferred embodiment of the present invention uses any one of the following mechanisms, routing algorithms, and protocols as part of WILD:

1. Diffusing update algorithm (DUAL), which is the basis for Cisco's EIGRP
2. Loop-Free path-finding algorithm (LPA)
3. Link-vector algorithm (LVA)
4. Bandwidth efficient source tree (BEST) protocol
5. Dynamic source tree (DST) routing protocol
6. Diffusing algorithm for shortest multipaths (DASM)
7. Multipath distance vector algorithm (MDVA)
8. Routing on-demand acyclic multipath (ROAM) protocol
9. Multiple-path partial-topology dissemination algorithm (MPDA)
10. Multipath loop-free routing algorithm (MPATH)
11. Adaptive link-state protocol (ALP)
12. A topology broadcast protocol, such as the one implemented in the Open Shortest Path First protocol (OSPF)
13. The path vector algorithm used as part of the Border Gateway Protocol (BGP)
14. A static table in a Web router specifying the next hops or paths to every other active Web router in the system.

Web routers exchange WILD update messages to update their distances to other Web routers, and to update the best TOS distances from Web caches, content servers and Web routers to client addresses. Referring back to the virtual topology of Web routers introduced in FIG. 2, FIG. 4 illustrates the best TOS distances maintained by Web routers for client 101; the figure shows a single TOS distance per Web router for client 101. The numbers in parenthesis indicate the local TOS distance followed by a pair in square brackets consisting of the best known TOS distance and the Web cache corresponding to such a TOS distance.

For example, Web router 220 stores a local TOS distance of 100 to client 101 and its best TOS distance to client 101 is 10 and Web cache 310 is the Web cache that should serve the client. Similarly, Web router 240 stores a local TOS distance of 15 to client 101 and its best TOS distance to client 101 is 10 and is provided by Web cache 350. Web routers 210 and 250 each have a local TOS distance of 10 to client 101, and that is also their best TOS distance to the client.

Web routers choose which TOS distance to adopt, and the Web cache providing such a distance, by computing the minimum of the TOS distances they receive from their neighbors and their local TOS distance to the same client, and in case of ties of minimum TOS distances received from neighbors and locally available; they choose the Web cache that is closest to them through the virtual topology of Web routers. In another embodiment of the present invention, a Web router can simply maintain all the Web caches and all the redirecting Web routers that have the minimum TOS distance to a client address range.

A WILD update message consists of two parts. One part corresponds to the information needed by Web routers to update their minimum-hop distances to one another, and the other part corresponds to the information needed by Web routers to update the mapping of client address ranges to the addresses of Web caches and redirecting Web routers that can serve such client address range through the best TOS distance.

In one embodiment of the present invention, a WILD update message conveys the mappings of client address ranges to the addresses of Web caches and redirecting Web routers by specifying the best TOS distance known from a Web cache or Web router to a specific client address range. In this case, a preferred embodiment of the present invention consists of the following three components:

(a) Basic routing update: This corresponds to the information needed in any of the aforementioned routing algorithms for the updating of minimum-hop distances to Web routers, which can include distances to Web routers, the distances and second-to-last hops in the paths to Web routers, the entire minimum-hop paths to Web routers, the identifiers and lengths of the virtual links defined between Web routers that form part of a min-hop path to a Web router, or the identifiers and lengths of the virtual links defined between Web routers that form part of the virtual topology of Web router.

(b) A list of TOS distances from Web caches to destinations, which includes the following:
  (i) A client address or client address range.
  (ii) A list of one or more Web cache records, each consisting of:
    (iia) The addresses of a Web cache or content server that can serve the client address range.
    (iib) The TOS distance from the Web cache or content server to the client address or address range.
    (iic) The addresses of the Web router co-located with the Web cache or content server.

(c) A list of TOS distance from redirecting Web routers to destinations, which includes the following:
  (i) A client address or client address range.
  (ii) A list of one or more Web router records, each consisting of:
    (iia) The address of a Web router that can be used to redirect clients with the reported address or address range.
    (iib) The TOS distance from the Web router to the client address or address range.

The subsequent description of the WILD protocol assumes that the aforementioned information is specified in WILD update messages. However, it should be evident to those of ordinary skill in the art that other formats and types of information can be used to implement the mapping between a client address range and the addresses of Web caches, content servers and redirecting Web routers.

Using the aforementioned information in WILD update messages, a Web router executes Procedure Local_Change, Procedure WLD_Update and Procedure Topology_Change, which are specified below in pseudocode, to update the matchings between client address ranges and the addresses of Web caches and redirecting Web routers that should serve them. Procedure Local_Change consists of the Web router running a path selection algorithm locally to compute its local TOS distances to client address ranges, and calling Procedure WILD_Update as if it were sending a WILD update to itself to note the changes that occur to local TOS distances to client address ranges. Procedure WILD_Update handles the reception of a WILD update by a Web router, and Procedure Topology_Change handles the occurrence of a topology change that causes one or more Web routers to become unreachable.

In this description, the procedure used by a Web router to update its minimum-hop distances to other Web routers is called Basic_Routing_Algorithm. The output of this procedure consist of an updated distance to each Web router known in the system, and a set of updates corresponding to new distances to Web routers, which the Web router needs to communicate to its neighbor Web routers.

For simplicity, it is assumed that a Web router maintains an anchoring router table (ART) consisting of one or multiple anchor entries, and each such entry specifying: (a) the address of an anchor Web router, (b) the list of destination address ranges for which the Web router serves as an anchor for the mapping from an address range to a Web cache address, and (c) the list of destination address ranges for which the Web router serves as the anchor for the mapping of the address range to itself as the redirecting Web router. The ART enables the Web router to determine for which destination address ranges it may have to obtain new mappings of Web caches or redirecting Web routers in the event that any Web router becomes unreachable.

An updated TOS distance from a Web cache to a client address or address range is reported in a WILD update message with an update entry [client, Web cache, TOS distance (from Web cache to client), anchor Web router], where the anchor Web router is the address of the Web router co-located with the Web cache or content server specified in the update entry.

An updated TOS distance from a redirecting Web router to a client address or address range is reported in a WILD update message with an update entry [client, redirecting Web router, TOS distance from redirecting Web router].

Procedures WILD_Update and Topology_Change call Procedure Send_WILD_Update in order for the Web router to communicate to its neighbor Web routers its updated distances to other Web routers and updated TOS distances from Web caches, content servers, and redirecting Web routers, to client addresses.

To simplify the pseudocode description below, a single Web cache and redirecting Web router is used for each client address range. Furthermore, a single TOS is used in the computation of mappings from client address ranges to the address of Web caches and redirecting Web routers. However, the same overall method specified herein applies to the case in which a set of Web caches and redirecting Web routers and multiple TOSs are used for each client address range.

Defined variables:

| | |
|---|---|
| c-id: | Client address range. |
| H(WR-id): | Minimum-hop distance to Web router WR-id at Web router executing Procedure WILD_Update. |
| D(c-id): | Best TOS distance from a Web cache to c-id at Web router executing Procedure WILD_Update. |
| C(c-id): | Address of Web cache or content server to be used for client address range c-id by Web router executing Procedure WILD_Update. |
| a(c-id): | Anchor of the mapping between a Web cache and c-id at Web router executing Procedure WILD Update. |
| DR(c-id): | Best TOS distance from a redirecting Web router to c-id at Web router executing Procedure WILD Update. |
| R(c-id): | address of redirecting Web router to be used for client address range c-id by Web router executing Procedure WILD_Update. |
| D_k(c-id): | TOS distance from a Web cache to c-id reported by neighbor Web router k and stored at Web router executing Procedure WILD_Update. |
| C_k(c-id): | Address of Web cache or content server that neighbor Web router k recommends for client address range c-id and stored at Web router executing Procedure WILD_Update. |
| DR_k(c-id): | TOS distance from a redirecting Web router to c-id reported by neighbor Web router k and stored at Web router executing Procedure WILD_Update. |
| R_k(c-id): | Address of redirecting Web router that neighbor Web router k recommends for client address range c-id and stored at Web router executing Procedure WILD_Update. |
| a_k(c-id): | Web router anchoring D_k(c-id) |
| UWR: | Unreachable Web Router list. |
| UWR.w: | Row in UWR listing Web router w. |
| ART: | Anchoring router table. |
| ART.w: | Row corresponding to Web router w in ART. |
| ART.w-c[j]: | Destination j for which Web router w is an anchor for the mapping to a Web cache address. |
| ART.w-r[j]: | Destination j for which Web router w is an anchor for the mapping to itself as a redirecting Web router. |

Procedure WILD_Update

```
*/ Executed when a WILD update message from self or neighbor
    Web router k is received /*
1. /* Determine new distances to Web routers that anchor mapping in-
    formation for client address ranges /*
   Call Update_Web_Routers;
2. /* Correct mappings from client address ranges to Web caches
    as needed /*
   for each UWR.w
   do begin
     a. q <- UWR.w
     b. for each destination ART.q-c[j]
     do begin
       b.1. Set <- { p | p is a neighbor Web router,
              H(a_p(j)) < infinity };
       b.2. if(Set != empty set)
         then begin
           D_min = Min{ D_p(j) | p is in Set };
           if ( D_min < infinity )
           then begin
             D(j) <- D_min;
             C(j) <- C_n(j) | D_n(j) = D_min;
             a(j) <- a_n(j) | D_n(j) = D_min
           end
           else begin
             D(j) = infinity;
             C(j) = null; a(j) = null
           end
         b.3. add update entry [j, C(j), D(j), a(j)]
              to WILD update message for all neighbors;
         b.4. Update-all <- true
       end
   end
```

3. /* Correct mappings from client address ranges to redirecting Web
      routers as needed /*
   For each UWR.w
    do begin
      a. q <- UWR.w
      b. for each destination ART.q-r[j]
        do begin
          b.1. Set <- { p | p is a neighbor Web router,
                      H(R_p(j)) < infinity );
          b.2. if (Set != empty set)
            then begin
              DR_min = Min{ DR_n(j) | n is in Set };
              if (DR_min < infinity)
                then begin
                  DR(j) <- DR_min;
                  R(j) <- R_n(j) | DR_n(j) = DR_min
                end
              else begin
                DR(j) = infinity;
                R(j) = null
              end
          b.3. add update entry [j, R(j), DR(j)]
                to WILD update message for all neighbors;
          b.4. Update-all <- true
        end
    end
4. Update-k <- false;
5. /* Process each update received to the mapping from client address
      range to the address of a Web cache /*
   for each update entry [c-id, CU(c-id), DU(c-id), au(c-id)]
   in WILD update message received from k
    do begin
      D_k(c-id) <- DU(c-id);
      C_k(c-id) <- CU(c-id);
      a_k(c-id) <- au(c-id);
      if ( H(au-id) = infinity )
        then begin /* neighbor k has reported an invalid mapping /*
          if ( H(a(c-id)) < infinity )
            then begin
              add update entry
                [c-id, C(c-id), D(c-id), a{c-id}]
                to WILD update message for all neighbors;
              Update-all <- true
            end
        else begin /* neighbor k has reported a valid mapping /*
          if ( D_k(c-id) < D(c-id) ) /* k has better TOS distance /*
            then begin
              D(c-id) <- D_k(c-id);
              C(c-id) <- C_k(c-id);
              a(c-id) <- a_k(c-id);
              add update entry [c-id, C(c-id), D(c-id), a{c-id}]
                to WILD update message for all neighbors;
              Update-all <- true
            end
          if ( D_k(c-id) > D(c-id) ) /* k needs better TOS distance /*
            then begin
              add update entry [c-id, C(c-id), D(c-id), a(c-id)]
                to WILD update message for neighbor k;
              Update-k <- true
            end
          end
        end
    end
6. /* Process each update received to the mapping from client address
      range to the address of a redirecting Web router /*
   for each update entry [c-id, RU(c-id), DRU(c-id)]
   in WILD update message received from k
    do begin
      DR_k(c-id) <- DRU(c-id);
      R_k(c-id) <- RU(c-id);
      if ( H(RU(c-id)) = infinity )
        then begin /* neighbor k has reported an invalid mapping /*
          if ( H(a(c-id)) < infinity )
            then begin
              add update entry
                [c-id, R(c-id), DR(c-id)]
                to WILD update message for all neighbors;
              Update-all <- true
            end
        else begin /* neighbor k has reported a valid mapping /*
          if ( DR_k(c-id) < DR(c-id) ) /* k has better TOS distance /*
            then begin
              DR(c-id) <- DR_k(c-id);
              R(c-id) <- R_k(c-id);
              add update entry [c-id, R(c-id), DR(c-id)]
                to WILD update message for all neighbors;
              Update-all <- true
            end
          if ( DR_k(c-id) > DR(c-id) ) /* k needs better TOS distance /*
            then begin
              add update entry [c-id, R(c-id), DR(c-id)]
                to WILD update message for neighbor k;
              Update-k <- true
            end
          end
        end
    end
7. /* Send necessary WILD updates to neighbor Web routers /*
   Call Send_WILD_Update
End WILD_Update
Procedure Topology_Change

*/ Executed when virtual topology of Web routers is modified /*
1. Call Update_Web_Routers;
2. for each UWR.w
    do begin
      a. q <- UWR.w
      b. /* Correct mappings from client address ranges to Web
          caches as needed /*
        for each destination ART.q-c[j]
          do begin
            b.1. Set <- { p | p is a neighbor Web router,
                        H(a_p(j)) < infinity };
            b.2. if (Set != empty set)
              then begin
                D_min = Min{ D_p(j) | p is in Set };
                if ( D_min < infinity )
                  then begin
                    D(j) <- D_min;
                    C(j) <- C_n(j) | D_n(j) = D_min;
                    a(j) <- a_n(j) | D_n(j) = D_min
                  end
                else begin
                  D(j) = infinity;
                  C(j) = null; a(j) = null
                end
            b.3. add update entry [j, C(j), D(j), a(j)]
                  to WILD update message for all neighbors;
            b.4. Update-all <- true
          end
      c. /* Correct mappings from client address ranges to redirecting Web
          routers as needed /*
        for each destination ART.q-r[j]
          do begin
            c.1. Set <- { p | p is a neighbor Web router,
                        H(R_p(j)) < infinity );
            c.2. if (Set != empty set)
              then begin
                DR_min = Min{ DR_n(j) | n is in Set };
                if (DR_min < infinity )
                  then begin
                    DR(j) <- DR_min;
                    R(j) <- R_n(j) | DR_n(j) = DR_min
                  end
                else begin
                  DR(j) = infinity; R(j) = null
                end
            c.3. add update entry [j, R(j), DR(j)]
                  to WILD update message for all neighbors;
            c.4. Update-all <- true
          end
    end
3. Call Send_WILD_Update
End Topology_Change
Procedure Update_Web_Routers 1. UWR <- empty;
2. Update-all <- false;

-continued

```
3. Execute Basic_Routing_Algorithm used to update distances from Web
      router to all other Web routers;
4. Add address of each Web router w that becomes unreachable to UWR;
5. Add update entries to WILD update message for all neighbors required
      by the basic routing algorithm to correct minimum-hop distances to
      Web routers;
6. If (WILD update entries are added to update message for neighbors)
      then Update-all <– true
End Update_Web_Routers
```

```
Procedure Local_Change

/* Executed when updates to intra-domain and inter-domain routing in-
      formation, or updates to the congestion of attached Web
      caches are received at the Web router. /*
1. Execute Local_Selection_Algorithm to update local TOS distances;
2. Add update entry to WILD update message for itself for each address
      range that obtains a new TOS distance from an attached Web cache;
3. if (Web router is a redirecting Web router)
      then add update entry to WILD update message for itself for each
         address range with a new TOS distance from the Web router;
4. Update-self <– true
5. call Send_WILD_Update
End Local_Change
Procedure Send_WILD_Update /* Executed when a WILD update is to be sent to neighbors or self /*
1. if (Update-self = true )
      then begin
         Update-self <– false; send WILD update to self
      End
2. for each neighbor k
   do begin
      if (Update-k = true)
         then begin
            Update-k <– false; send WILD update message to k
         end
   end
3. if (Update-all = true)
      then begin
         Update-all < false;
         send WILD update message to all neighbor Web routers
      end
End Send_WILD_Update
```

FIGS. 5a–5d show an example of the present invention when a Web router receives a WILD update from a neighbor Web router. In this example, the congestion in the network from Web cache 310 to client 101 increases, making the local TOS distance from Web router 210 to client 101 equal 40 as a result of executing Procedure Local_Change, which in turn calls Procedure WILD_Update.

As shown in FIG. 5(a), Web router 210 sends a WILD update after executing Procedure WILD_Update to report its new best TOS distance to client 101, which equals 40, and the fact that Web cache 310 should be used to serve the client. The WILD update from Web router 210 is received by its neighbor Web routers 220 and 230. As a result of the WILD update from Web router 210, Web router 220 computes its new best TOS distance to client 101 using the TOS distances it has received from its neighbor Web routers and its locally available TOS distance to client 101, and Web router 220 then sends a WILD update stating a TOS distance of 40 to client 101 and Web cache 310 as the cache to serve client 101 (see FIG. 5(b)).

Similarly, Web router 230 sends a WILD update stating a TOS distance to client 101 equal to 10 and Web cache 350 as the one to serve the client. As FIG. 5(c) shows, the WILD update from Web router 220 causes Web router 205 to send a WILD update stating a TOS distance to client 101 equal to 10 and Web cache 350 as the one to serve the client. The WILD update from Web router 230 makes Web router 210 change its best TOS for client 101 to 10 and to set Web cache 350 as the one to serve client, and Web router 210 sends a WILD update accordingly. On the other hand, Web router 240 does not modify its best TOS distance for client 101 after processing the WILD update from Web router 230.

FIG. 5(d) illustrates Web router 220 sending a WILD update with a TOS distance to client 101 equal to 10 and Web cache 350 as the one to serve the client. This example illustrates the fact that WILD updates propagate over the topology of Web routers only as far as they need to go to enable all Web routers store the minimum TOS distances to clients.

Thus a scheme for enabling the discovery of the caches and servers storing information objects distributed over computer networks, which can be implemented in hardware and/or software, has been described. It should be appreciated that some embodiments of the present invention make use of so-called network-layer URL (NURL) routing. This routing technique involves mapping requested URLs to unicast addresses, which are then used as an anycast IP address (i.e., a unicast address advertised by multiple, physically distinct points in an internet). See, e.g., Craig Partridge, Trevor Mendez, and Walter Milliken, "Host anycasting service RFC 1546," November 1993. A system and method for using uniform resource locators (URLs) to map application layer content names to network layer anycast addresses, the aforementioned mapping, is disclosed in co-pending and commonly-owned U.S. Provisional Application No. 60/200, 511, entitled "System and Method for Using URLs to Map Application Layer Content Names to Network Layer Anycast Addresses", filed Apr. 28, 2000 by J. J. Garcia-Luna-Aceves and Bradley R. Smith, the complete disclosure of which is hereby incorporated by reference. Furthermore, a system and method for using network layer URL routing to locate the closest server carrying specific content (network-level routing of URLs) is disclosed in co-pending and commonly-owned U.S. Provisional Application No. 60/200, 402, entitled "System and Method for Using Network Layer URL Routing to Locate the Closest Server Carrying Specific Content (NURL Routing) filed Apr. 28, 2000 by J. J. Garcia-Luna-Aceves and Bradley R. Smith, the complete disclosure of which is hereby incorporated by reference.

With the route to the anycast cache server existing in the network infrastructure, a cache server processing a cache miss would like to transfer the content from the URL IP address. In an exemplary embodiment, in such a situation, the present invention resolves the anycast address to the server's real unicast address (which, by definition, uniquely identifies that server in the internet) before starting the download. In an exemplary embodiment, this is done by using an anycast address resolution protocol (AARP), which is disclosed in co-pending and commnonly-owned U.S. Provisional Application No. 60/200,403, entitled "System and Method for Resolving Network Layer Anycast Addresses to Network Layer Unicast Addresses (AARP), filed Apr. 28, 2000 by J. J. Garcia-Luna-Aceves and Bradley R. Smith, the complete disclosure of which is hereby incorporated by reference.

Thus, although the foregoing description and accompanying figures discuss and illustrate specific embodiments, the present invention is to be measured only in terms of the claims that follow, and their equivalents.

What is claimed is:

1. A communication protocol, comprising messages passed between Web routers over a reliable transmission protocol used for inter-Web router communication, said messages (i) conveying mappings of client address ranges to addresses of Web caches and redirecting Web routers by specifying best distances known from individual ones of the Web caches or the redirecting Web routers to specific ones of the client address ranges, and (ii) organized as (a) routing updates having information needed for updating of minimum-hop distances to redirecting Web routers, (b) lists of distances from the Web caches to destinations, and (c) lists of distance from the redirecting Web routers to said destinations, wherein said destinations include one or more Web cache records, each comprising (a) addresses of specified ones of the Web caches or a content server that can serve specified ones of the client address ranges, (b) best distances from the specified ones of the Web caches or the content server to the specified ones of the client address ranges, and (c) addresses of those of the Web routers co-located with the specified ones of the Web caches or the content server.

2. The communication protocol of claim 1, wherein the routing updates include one or more of distances to some or all of the Web routers, distances and second-to-last hops in the paths to some or all of the Web routers, entire minimum-hop paths to some or all of the Web routers, identifiers and lengths of virtual links defined between those of the Web routers that form part of a min-hop path to a first one of the Web routers, and identifiers and lengths of virtual links defined between those of the Web routers that form part of a virtual topology of Web routers defining an overlay network.

3. The communication protocol of claim 1, wherein said destinations include the client address ranges.

* * * * *

UNITED STATES PATENT AND TRADEMARK OFFICE
CERTIFICATE OF CORRECTION

PATENT NO. : 7,162,539 B2  Page 1 of 1
APPLICATION NO. : 09/810148
DATED : January 9, 2007
INVENTOR(S) : Jose K. Garcia-Luna-Aceves It is certified that error appears in the above-identified patent and that said Letters Patent is hereby corrected as shown below:

On Title Page, item (75): delete "Jose J. Garcie-Luna-Aceves" and insert --Jose J. Garcia-Luna-Aceves--.

Column 7, line 23: delete "Backweb, Marimba and Pointcast" and insert --Backweb, Marimba and Pointcast--.

Column 10, line 6: delete "Wed router" and insert --Web router--.

Signed and Sealed this

Fourteenth Day of August, 2007

JON W. DUDAS
*Director of the United States Patent and Trademark Office*